US012291091B2

(12) United States Patent
Zeiler et al.

(10) Patent No.: US 12,291,091 B2
(45) Date of Patent: May 6, 2025

(54) USER-SCALABLE POWER UNIT INCLUDING REMOVABLE BATTERY PACKS

(71) Applicant: Briggs & Stratton, LLC, Wauwatosa, WI (US)

(72) Inventors: Jeffrey Zeiler, Pewaukee, WI (US); Robert John Koenen, Pewaukee, WI (US); Jacob Schmalz, Milwaukee, WI (US); Albert Liu, Dongguan (CN); Nick Zeidler, Brookfield, WI (US); Scott Funke, New Berlin, WI (US); David Procknow, Elm Grove, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 18/128,548

(22) Filed: Mar. 30, 2023

(65) Prior Publication Data

US 2023/0234432 A1 Jul. 27, 2023

Related U.S. Application Data

(62) Division of application No. 17/387,337, filed on Jul. 28, 2021, now Pat. No. 11,642,952, which is a
(Continued)

(51) Int. Cl.
*B60K 1/04* (2019.01)
*A01D 69/02* (2006.01)
(Continued)

(52) U.S. Cl.
CPC ............. *B60K 1/04* (2013.01); *A01D 69/02* (2013.01); *B60L 50/66* (2019.02); *B60L 53/80* (2019.02);
(Continued)

(58) Field of Classification Search
CPC ........................... B60L 58/22; H02J 7/0045
See application file for complete search history.

(56) References Cited

U.S. PATENT DOCUMENTS 5,867,007 A 2/1999 Kim
6,313,611 B1 11/2001 Mowry et al.
(Continued)

FOREIGN PATENT DOCUMENTS

CN 105103365 B * 10/2017 ........ H01M 10/4257
DE 10 2013 114 892 7/2015
(Continued)

OTHER PUBLICATIONS

International Search Report and Written Opinion for International Patent Application No. PCT/US2017/046213 mailed Oct. 19, 2017.

*Primary Examiner* — Daniel Cavallari
(74) *Attorney, Agent, or Firm* — Foley & Lardner LLP

(57) ABSTRACT

A riding lawn mower comprising, a pair of rear drive wheels, a pair of front wheels, a deck positioned between the pair of front wheels and the pair of rear drive wheels, a rotatable cutting blade, and multiple battery packs removably coupled to the riding lawn mower and structured to provide power to the riding lawn mower, each battery pack graspable and removable by a user, wherein the multiple battery packs sequentially provide power to the riding lawn mower.

8 Claims, 16 Drawing Sheets

Related U.S. Application Data division of application No. 16/323,408, filed as application No. PCT/US2017/046213 on Aug. 10, 2017, now Pat. No. 11,820,218.

(60) Provisional application No. 62/501,302, filed on May 4, 2017, provisional application No. 62/420,614, filed on Nov. 11, 2016, provisional application No. 62/373,018, filed on Aug. 10, 2016.

(51) Int. Cl.
| | | |
|---|---|---|
| *B60L 50/60* | (2019.01) | |
| *B60L 53/80* | (2019.01) | |
| *B60L 58/22* | (2019.01) | |
| *H01M 10/42* | (2006.01) | |
| *H01M 10/44* | (2006.01) | |
| *H01M 50/213* | (2021.01) | |
| *H02J 7/00* | (2006.01) | |
| *H02J 7/14* | (2006.01) | |

(52) U.S. Cl.
CPC ......... *B60L 58/22* (2019.02); *H01M 10/4257* (2013.01); *H01M 10/441* (2013.01); *H01M 50/213* (2021.01); *H02J 7/0016* (2013.01); *H02J 7/0024* (2013.01); *H02J 7/0025* (2020.01); *H02J 7/0045* (2013.01); *H02J 7/0063* (2013.01); *B60K 2001/0416* (2013.01); *B60K 2001/0455* (2013.01); *B60K 2001/0466* (2013.01); *B60L 2200/42* (2013.01); *B60Y 2200/124* (2013.01); *B60Y 2200/15* (2013.01); *B60Y 2200/223* (2013.01); *H01M 2010/4271* (2013.01); *H01M 2220/20* (2013.01); *H02J 7/14* (2013.01); *H02J 7/1423* (2013.01); *H02J 7/1438* (2013.01); *Y02T 10/70* (2013.01)

(56) References Cited

U.S. PATENT DOCUMENTS

| | | |
|---|---|---|
| 8,025,118 B2 | 9/2011 | Scheucher |
| 8,733,470 B2 | 5/2014 | Matthias et al. |
| 9,128,159 B2 | 9/2015 | Mousseau et al. |
| 9,912,017 B1 | 3/2018 | Kuo et al. |
| 10,485,166 B2 | 11/2019 | Wang et al. |
| 2007/0184339 A1 | 8/2007 | Scheucher |
| 2010/0275564 A1 | 11/2010 | Baetica et al. |
| 2012/0227369 A1 | 9/2012 | Koike et al. |
| 2012/0274331 A1 | 11/2012 | Liu et al. |
| 2012/0319652 A1 | 12/2012 | Namou et al. |
| 2013/0038289 A1 | 2/2013 | Tse |
| 2013/0183561 A1 | 7/2013 | Laitinen |
| 2014/0176073 A1 | 6/2014 | Shrinkle |
| 2015/0022140 A1 | 1/2015 | Heishi et al. |
| 2015/0221993 A1 | 8/2015 | Wang et al. |
| 2015/0333666 A1 | 11/2015 | Miller et al. |
| 2016/0183451 A1 | 6/2016 | Conrad et al. |
| 2016/0226263 A1 | 8/2016 | Seo et al. |
| 2017/0054134 A1* | 2/2017 | Choi .............. G01R 31/36 |
| 2018/0248388 A1 | 8/2018 | Takatsuka et al. |
| 2019/0181659 A1 | 6/2019 | Kim |
| 2019/0214932 A1 | 7/2019 | Barrass et al. |

FOREIGN PATENT DOCUMENTS

| | | |
|---|---|---|
| GB | 2 545 922 A | 7/2017 |
| WO | WO-2011/120415 A1 | 10/2011 |

* cited by examiner

USER-SCALABLE POWER UNIT INCLUDING REMOVABLE BATTERY PACKS

CROSS-REFERENCE TO RELATED APPLICATIONS

This application is a divisional of U.S. patent application Ser. No. 17/387,337, filed Jul. 28, 2021, which is a divisional of U.S. patent application Ser. No. 16/323,408, filed Feb. 5, 2019, which is a National Stage Application of International Application No. PCT/US2017/046213, filed Aug. 10, 2017, which claims the benefit of: (i) U.S. Provisional Patent Application No. 62/373,018, filed on Aug. 10, 2016, (ii) U.S. Provisional Patent Application No. 62/420,614, filed on Nov. 11, 2016, and (iii) U.S. Provisional Patent Application No. 62/501,302, filed on May 4, 2017, all of which are incorporated herein by reference in their entireties.

FIELD

The present disclosure generally relates to a scalable power unit including multiple battery packs for use with riding vehicles and other high power applications. More specifically, the present disclosure relates to a scalable power unit that allows multiple combinations of multiple battery packs to be configured for use with riding vehicles while also allowing the individual battery packs to be separately removed for use with other power equipment and subsequently replaced as desired without the need for any external tools. The present disclosure is contemplated for use with riding vehicles, including but not limited to all-terrain vehicles (ATVs), riding lawn tractors, zero turn mowers, stand-on mowers, utility vehicles, crossover utility vehicles (example: Gator™), high-performance utility vehicles, forklifts, spreaders and others. Additionally, the present disclosure relates to a scalable power unit that allows multiple combinations of battery packs to be used in high power applications, such as back up power systems, standby power systems, portable power units, high power outdoor power equipment, such as snow throwers, turf care equipment (aerators, sod cutter, dethatchers), debris vacuums, pressure washers, blowers, tillers, edgers, construction equipment (concrete saws, compactors, vibrating plates), riding mowers, zero turn mowers. High power applications refer generally to applications requiring greater than 1 kW peak power. Other applications could also include lighting towers, electricity generators, inverters and air compressors.

BACKGROUND

Traditionally, riding vehicles, such as all-terrain vehicles, utility vehicles, riding lawn tractors, ZTR mowers, forklifts and other large equipment operate utilizing an internal combustion engine that provides both the drive force for moving the vehicle and the motive force for operating auxiliary devices, such as rotating one or more cutting blades. Recent developments in battery cell technology have made it increasingly possible to power riding vehicles utilizing one or more battery packs.

Connecting multiple battery packs together can increase the capacity of the battery power supply system. For example, connecting multiple battery packs in parallel generally increases the capacity (amp-hours) of the battery power supply system while the combined output retains the voltage level of the individual battery packs. However, if the voltages of the battery packs, when connected in parallel, are not approximately equal, charging and discharging issues can arise.

One such issue for parallel-connected battery packs is referred to as cross charging. Cross charging can occur when one of the battery packs is at a higher voltage, or state of charge, than the state of charge of other parallel-connected battery packs. When this occurs, current from the battery pack at the highest state of charge will begin to charge the battery packs at lower voltages. This may reduce the cycle life of the battery packs or damage the battery packs during the undesired charging and discharging.

The difference in charges of each of the battery packs within the parallel-connected battery pack system can occur if one or more of the battery packs are temporarily removed and used for powering other applications, such as other pieces of lawn equipment. The present disclosure attempts to address this problem by providing a power unit that includes a control unit and switchable elements to control the charging and discharging sequencing of the individual battery packs.

SUMMARY

The present disclosure relates to a scalable power unit that is operable to power an electrical load, such as the motor(s) of a riding vehicle. The scalable power unit includes a number of removable and rechargeable battery packs. Each of the removable and rechargeable battery packs includes a number of battery cells joined together to generate a current and voltage output. The scalable power unit enables an end user to determine the amount of energy available from the scalable power unit by incorporating different numbers of the rechargeable battery packs.

A riding lawn mower comprising, a pair of rear drive wheels, a pair of front wheels, a deck positioned between the pair of front wheels and the pair of rear drive wheels, a rotatable cutting blade, and multiple battery packs removably coupled to the lawn mower. The multiple battery packs are structured to provide power to the lawn mower and each battery pack is graspable and removable by a user. The multiple battery packs jointly provide power to the lawn mower.

A riding lawn mower comprising, a pair of rear drive wheels, a pair of front wheels, a deck positioned between the pair of front wheels and the pair of rear drive wheels, a rotatable cutting blade, and multiple battery packs removably coupled to the lawn mower. The multiple battery packs are structured to provide power to the lawn mower and each battery pack is graspable and removable by a user. The multiple battery packs sequentially provide power to the lawn mower.

BRIEF DESCRIPTION OF THE DRAWINGS

The drawings illustrate the best mode presently contemplated of carrying out the disclosure. In the drawings.

DETAILED DESCRIPTION

Figure 1:
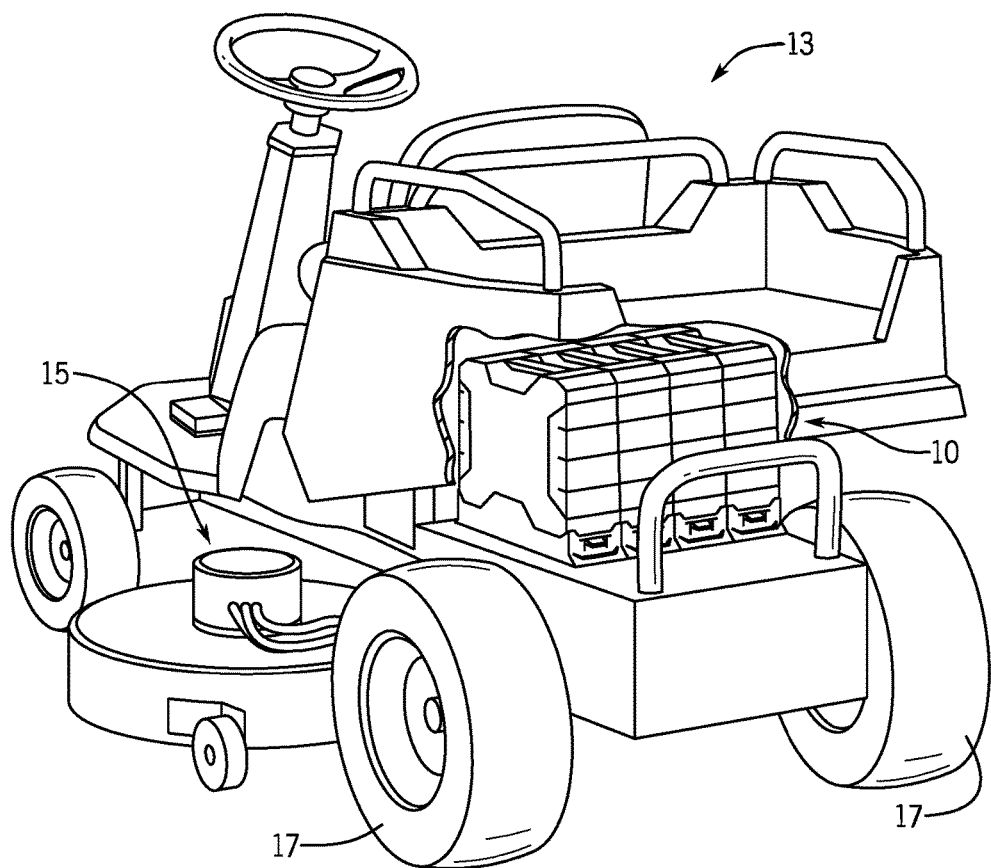
FIG. 1 is a perspective view of a scalable electric power unit installed on a riding vehicle, such as a lawn tractor according to some embodiments.
Figure 2:
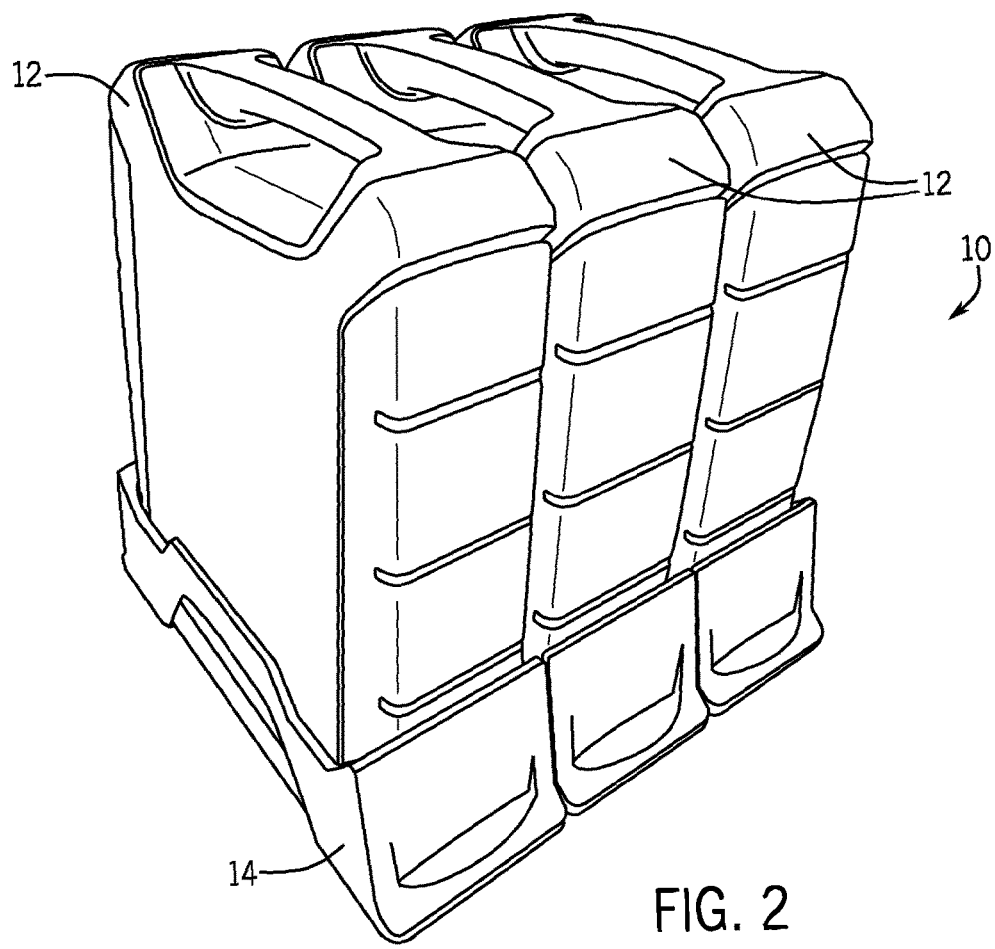
FIG. 2 is a perspective view of the scalable power unit incorporating multiple battery packs according to some embodiments.

FIG. 1 illustrates a scalable power unit 10 mounted on the back end of a lawn tractor 13 to power the motors 15 used for the rotating cutting blades as well as an electric motor or motors used to provide the motive force for the rear drive wheels 17. FIG. 2 illustrates one embodiment of the scalable power unit 10 of the present disclosure. In the embodiment shown in FIG. 2, a scalable power unit 10 is shown. The scalable power unit 10 is meant to provide the required electrical power to drive an electric motor, such as may be used to propel a riding vehicle, which could include the lawn tractor 13 of FIG. 1, an ATV, utility vehicle, forklift or other similar vehicle. In the embodiment shown in FIG. 2, the scalable power unit 10 includes three battery packs 12 that are each received within a separate battery tray 14. The scalable power unit 10 enables the end user to determine the amount of energy available from the scalable power unit 10 to power an electrical load. This allows the end user to scale the energy available from the scalable power unit 10 to his/her particular needs. The scalable power unit 10 is scalable or modular by the end user so that the end user is able to scale or manage the available energy from the system by selecting and installing the number of battery packs 12 needed to suit the user's specific needs. This allows the user to scale the power unit as needed in response to the user's overall needs, and in response to the user's needs for a specific task For example, a first user with a large lawn may purchase a lawn tractor equipped with the scalable power unit 10 for providing power to an electrically powered drive system and/or an electrically powered mower blade, and purchase a number of battery packs 12 that provide sufficient power to mow the entirety of the first user's lawn (e.g., four battery packs). A second user with a smaller lawn may purchase the same lawn tractor, but with fewer battery packs, which provide sufficient power to the mow the entirety of the second user's lawn (e.g., three battery packs).

As indicated above, although a lawn tractor 13 is shown in FIG. 1, the scalable power unit 10 could be used to power a wide variety of riding vehicles and end products. These vehicles and end products may include outdoor power equipment, portable jobsite equipment, standby or portable power supplies, recreational or sporting equipment, and vehicles. Outdoor power equipment includes lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, sprayers, spreaders, etc. Outdoor power equipment may, for example, use an electric motor to drive an implement, such as a rotary blade of a lawn mower, a pump of a pressure washer, the auger a snow thrower, and/or a drivetrain of the outdoor power equipment. Portable job site equipment includes portable light towers, mobile industrial heaters, and portable light stands. Standby or portable power supplies include standby generators, portable generators, and stand-alone power supplies such as a backpack power supply for powering handhold power tools (e.g., leaf blowers, string trimmers, etc.). Recreational or sporting equipment includes ice augers, trolling motors, fish finders, boat anchor winches, bilge pumps, and fish well aerators. Vehicles include automobiles, trucks, motorcycles and other over—the road vehicles, boats such as fishing and recreational boats, snowmobiles, golf carts, and recreational off-highway vehicles such all-terrain vehicles and utility task vehicles.

For outdoor power equipment, the scalable power unit 10 allows the end user to manage the run time, load capability, or other operating characteristics of the outdoor power equipment by equipping the scalable power unit 10 with more battery packs 12 as needed for one task (e.g., for a longer run time) and fewer battery packs 12 as needed for a second task (e.g., for a shorter run time). In an electric or hybrid vehicle, the scalable power unit 10 is used as a primary power supply or to supplement the main power supply, and allows the end user to manage the run time and range of the vehicle. In a backup power supply, the scalable power unit 10 allows the end user to manage the time or quantity of backup power provided by the backup power supply. Regardless of the end product or application, the end user is able to scale the total amount of available energy or energy capacity of the scalable power unit 10 by determining how many battery packs 12 (e.g., one, two, three, four, etc.) or what type of battery packs (e.g., by choosing among compatible battery packs having different voltage, battery capacity, energy capacity, or other power ratings) are necessary to meet that particular user's needs in terms of runtime, power, etc. for a particular task. This scalable energy capacity ultimately reduces costs to the end user because the user does not have to purchase more energy capacity than necessary for their specific application needs.

The end user can also share battery packs among multiple applications, which reduces costs to the end user.

Each battery pack 12 includes a number of battery cells enclosed within an outer housing. In some embodiments, the battery cells are lithium-ion cells. The cells are arranged with groups of cells connected in series (S) and with groups of cells connected in parallel (P) (e.g., in a 20S5P configuration, a 14S6P a configuration, a 13S6P configuration, etc.) By providing groups of cells arranged in parallel with one another, the battery pack 12 is able to maintain system voltage, even when experiencing losses in capacity. If the cells were only connected in series, a break amongst the series connections would cause the system voltage provided by the battery module to drop.

However, by arranging cells in groups connected in series and connecting the groups in parallel, the system voltage does not drop if a series connection breaks, and if a parallel connection between groups of cells breaks, capacity is lost, but the system voltage is maintained. For the system voltage to drop, all of the parallel connections between the groups of cells would need to be broken and a break in the series connection would need to occur. Maintenance of a consistent system voltage is important for proper operation of a motor or other equipment powered by the battery pack 12. In some embodiments, the battery packs 12 may function as the prime or sole power source for the end product (e.g., outdoor power equipment, a backup or portable power supply) or as a backup or supplemental power source for the end product (e.g., a vehicle, or a backup power supply also including an alternator powered by an internal combustion engine).

In one configuration, the battery pack 12 includes seventy-eight cells. Each cell is rated at 3.6 volts and 2.5 amp-hours. The battery pack 12 arranges the cells in a 13S6P configuration with 13 cells connected in series in a group and six groups of cells connected in parallel. The series configuration yields a system voltage of 46.8 volts for the battery pack 12. The six parallel configuration yields fifteen amp-hours capacity for the battery pack 12. The combination of the two provides 702 watt-hours energy capacity for the battery pack.

In some embodiments, the battery pack 12 has the cells arranged in multiple layers. For a 13S6P configuration battery pack 12, each layer includes cells arranged in six groups and the battery pack 12 includes two layers of cells, one layer with six groups of six cells and one layer with six groups of seven cells. In this embodiment the battery pack 12 weighs about 10.75 pounds and is substantially shaped like a cube.

In an alternative embodiment, the cells are arranged in a single layer with six groups of thirteen cells each. In a scalable power unit 10 using four of the 13S6P configuration battery packs 12, the total energy capacity would be 2808 watt-hours (2.8 kilowatt-hours). In this embodiment the battery pack 12 weighs about 10.75 pounds and is substantially shaped like a rectangle, as shown in FIG. 2.

In another configuration, the battery pack 12 includes eighty-four cells arranged in a 14S6P configuration. Using cells rated at 3.6 volts and 2.5 amp-hours, this configuration yields a voltage of 50.4 volts, 15 amp-hours of capacity and 756 watt-hours of energy capacity. In other embodiments using cells rated at 3.9 volts and 2.5 amp-hours, a 13S6P arrangement would yield a voltage of 50.7 volts, 15 amp-hours of capacity, and 760.5 watt-hours of energy. In the 14S6P configuration, the voltage would be 54.6 volts, 15 amp-hours of capacity, and 819 watt-hours of energy.

In another configuration, the battery pack 12 includes one hundred cells arranged in a 20S5P configuration having five groups of twenty cells each. Each group or row of twenty cells is welded or otherwise connected together in series, and each of the five groups of twenty cells is welded or connected together in parallel (e.g., by conductors). The cells used in the battery pack may be 18650 form factor cylindrical cells (18 millimeter diameter and 65 millimeter length). These cells may be available in 3.2 amp-hours, 2.9 amp-hours, 2.5 amp-hours, and other cell ratings. Using cells rated at 3.6 volts, and 3.2 amp-hours, a 20S5P configuration battery module provides a voltage of 72 volts, 16 amp-hours of capacity, and 1152 watt-hours of energy. Using cells rated at 3.6 volts, and 2.9 amp-hours, a 20S5P configuration battery module provides a voltage of 72 volts, 14.5 amp-hours of capacity, and 1044 watt-hours of energy. Using cells rated at 3.6 volts and 2.5 amp-hours, a 20S5P configuration battery pack provides a voltage of 72 volts, 12.5 amp-hours of capacity, and 900 watt-hours of energy.

In some embodiments, the battery pack 12 provides about one kilowatt-hour of energy (e.g., between 800 watt-hours and 1.2 kilowatt-hours) and weighs less than twenty pounds. Because the scalable power unit 10 is scalable by the end user by installing and removing battery packs 12 as needed, the battery packs 12 need to be of a manageable size and weight for the end user to lift, carry, install, remove, etc. so that the battery module is configured to provide manually portability by the user. The battery pack 12 is small enough, light enough, and graspable enough to allow the battery pack 12 to be manually portable by the user. The user does not need a lift, cart, or other carrying device to move the battery packs. Also, end products powered by the scalable power unit 10 generally scale in increments that can be measured in kilowatt-hours of energy. For example, a standard residential lawn tractor may require between two and three kilowatt-hours of energy capacity and a premium residential lawn tractor may require between three and four kilowatt-hours of energy capacity. Battery packs 12 that provide about one kilowatt-hour of energy and weigh less than twenty pounds allow the end user to easily choose between a standard configuration and premium configuration of the lawn tractor or other end product by providing a reasonable number of battery modules to achieve either configuration and battery modules of a size and weight that can be easily manipulated as needed by the end user. The battery packs 12 are interchangeable between different pieces of equipment each equipped with a scalable power unit 10 (e.g., between a lawn tractor, a vehicle, a backup power supply, a stand-alone power supply, a portable generator, and a trolling motor).

Figure 4:
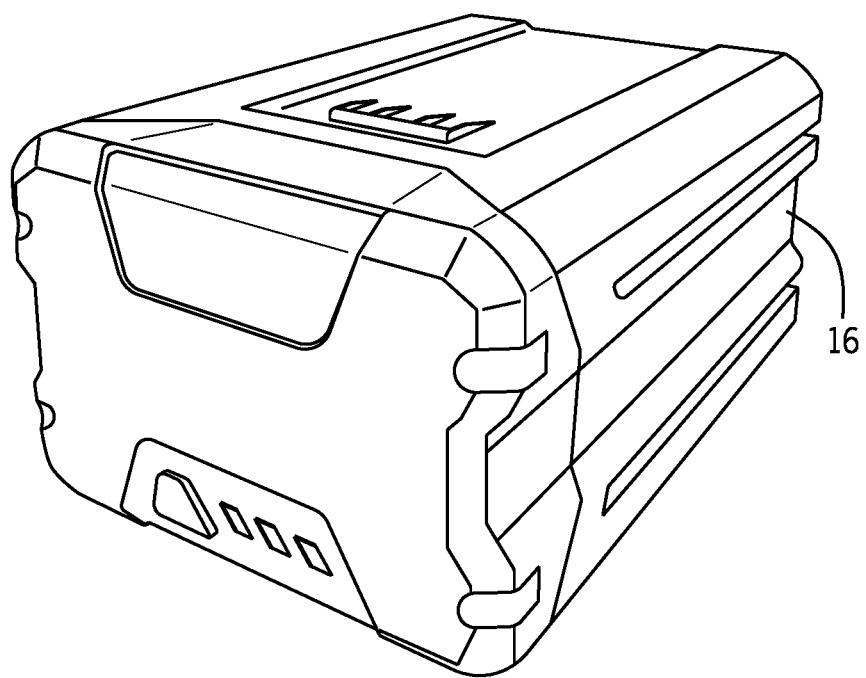
FIG. 4 is an illustration of a smaller battery pack according to some embodiments that could be utilized with the scalable power unit.

Referring back to FIG. 2, each of the individual battery packs 12 includes an outer housing having a handle that allows the battery packs 12 to be removed from the battery tray 14 and used with other types of equipment or in other applications. The battery packs 12 shown in FIG. 2 have a weight of approximately 13-15 pounds. In the embodiment illustrated, the battery packs 12 are each 1 kW battery packs. However, it is contemplated that different sized battery packs could be utilized while operating within the scope of the present disclosure. In the embodiment shown in FIG. 2, each of the battery packs 12 has the same physical size and electrical capacity. However, it is also contemplated that different types of battery packs, such as the physically smaller battery pack 16 shown in FIG. 4, could be utilized in place of the battery packs 12 or along with one or more of the battery packs 12. The battery pack 16 shown in FIG. 4 is an 80-volt lithium ion battery pack that is smaller in both physical size and capacity as compared to the battery packs 12 shown in FIG. 2. Once again, it is contemplated that different size capacity battery packs could be utilized while operating within the scope of the present disclosure.

Figure 3:
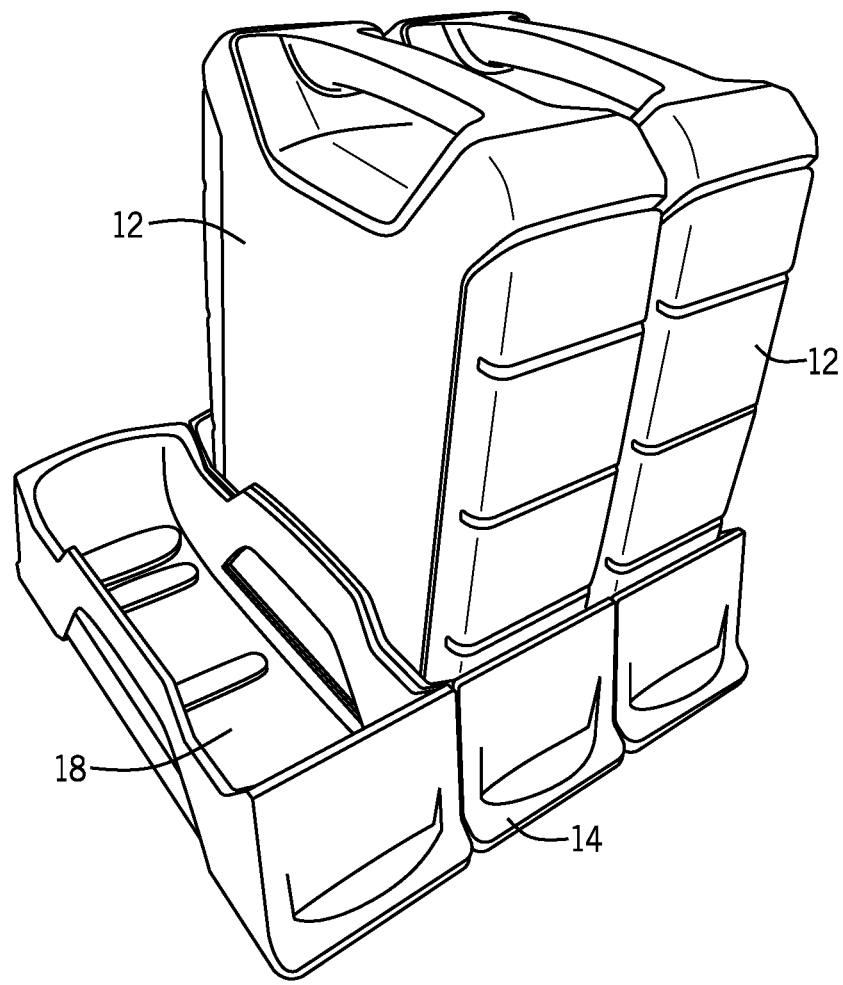
FIG. 3 is a view similar to FIG. 1 with one of the battery packs removed.

In the state shown in FIG. 3, one of the battery packs 12 has been removed from the battery tray 14 such that one of the battery slots 18 is open. In an alternative state, two of the battery packs 12 can be removed such that two battery slots 18 are open and each can receive one of the battery packs. In some embodiments, a cover (not shown) or other protective device is provided to cover open battery slots 18 that do not have a battery pack 12 installed (e.g., when a user has elected to use a subset of the available receptacles for a particular task). Depending on the needs of a particular user, the scalable power unit 10 may have one or more unused or empty battery slots 18. The cover prevents water and debris from accumulating in the unused battery slots 18 and limits user access to the unused battery slots 18. The cover may be secured in place by the same locking mechanism as the battery packs 12.

Although not fully illustrated in FIGS. 2-3, each of the battery slots 18 will include internal contacts that provide electrical connections to each of the battery packs 12. The internal contacts will be located either on the floor of the battery slot or on one of the vertical sidewalls. The internal contacts can provide both electrical connections to the battery pack for charging and discharging as well as a point of communication to internal circuitry and components that may be contained within the battery packs.

When one of the battery packs 12 is removed from the battery tray 14, the removed battery pack can be used to provide power to a wide range of other types of lawn or power equipment. These potential uses could be single stage snow throwers, turf care equipment (aerators, sod cutter, dethatchers), debris vacuums, pressure washers, blowers, tillers, edgers, construction equipment (concrete saws, compactors, vibrating plates), riding mowers or zero turn mowers. High power applications refer generally to applications requiring greater than 1 kW peak power, which could include lighting towers, electricity generators, inverters or air compressors. Since each of the battery packs 12 is preferably a 1 kW battery, such a battery or combination of batteries can be used to power a wide variety of equipment. In some embodiments, the battery pack 12 could be worn on the back of a user in a back pack (FIG. 15) and connected to the power equipment, such as an edger or blower, through a cord and an adapter that is received within the power equipment.

When a user initially purchases a battery powered riding vehicle, the user will be able to select the number of batteries included with the purchase based upon the desired run time for the vehicle. For example, if the vehicle will be used for only short durations between charging, the run time needed may only require two of the battery packs 12, which will decrease the cost of the vehicle compared to an embodiment that needs three or four battery packs 12. If the owner finds that he/she needs additional runtime, the owner can purchase another battery pack and add the battery pack to those already being used in the battery tray. In this manner, the multi-slot battery tray 14 allows for the removal of the battery packs to power other equipment and the addition of battery packs to extend the run time of the riding vehicle. In each case, the owner is able to maximize the usefulness of the relatively large and expensive battery packs.

In addition to providing flexibility to the user, OEMs can select the number of battery packs needed based on the size of the vehicle and the desired run time. An OEM can then sell different "rated" vehicles depending upon the number of battery packs included with the initial purchase.

Figure 5:
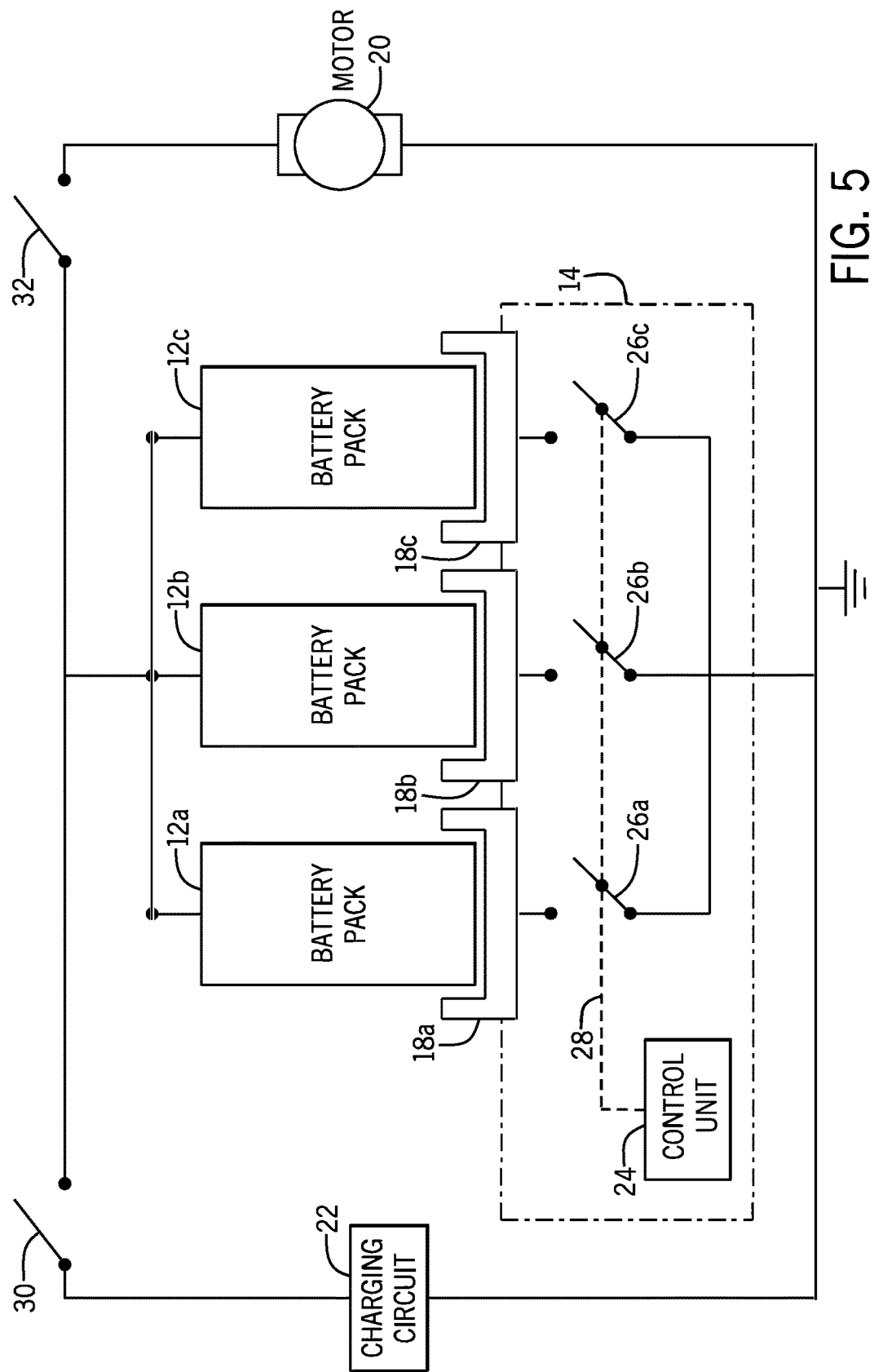
FIG. 5 is an electrical schematic illustration of the connections between the multiple battery packs, a control unit, a charging circuit and a motor according to some embodiments.
Figure 8A:
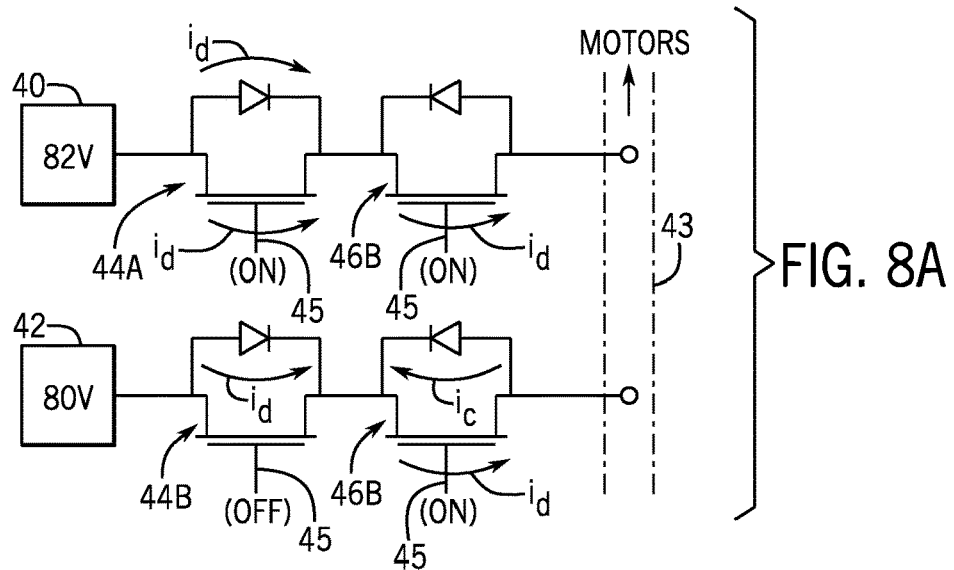
FIGS. 8A-8C are electrical schematics showing the operation of charging and discharging MOSFETS for each of a pair of battery packs according to some embodiments.
Figure 8B:
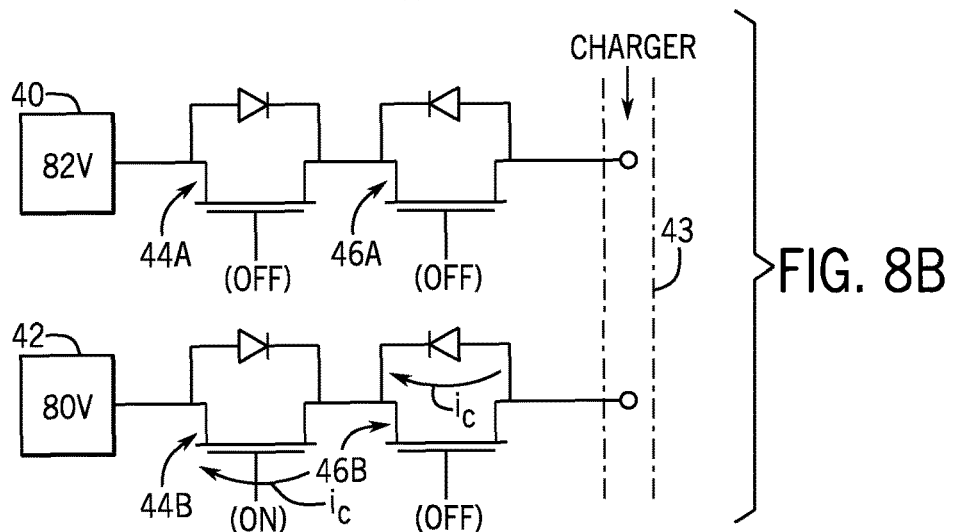
Figure 8C:
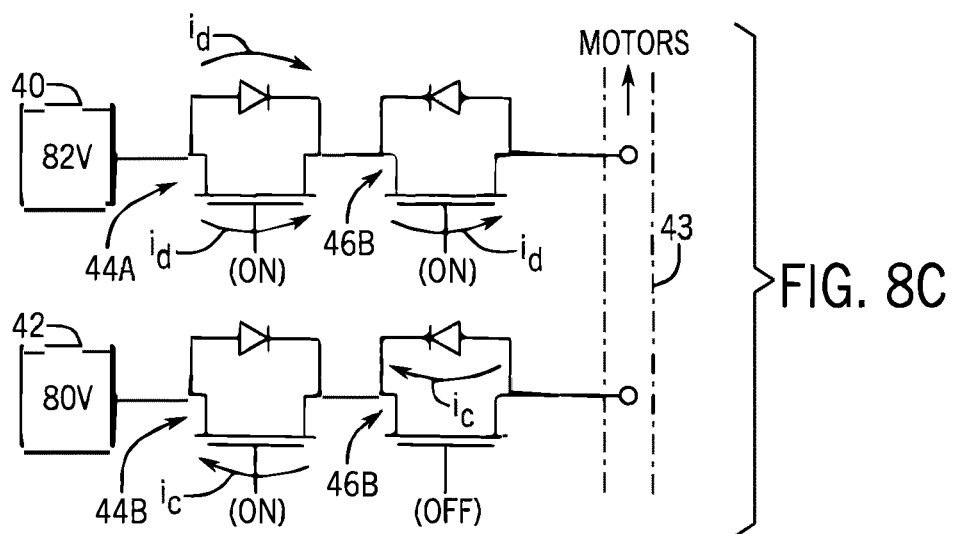

FIG. 5 illustrates the electrical connections utilized to power one or more motors 20 and for recharging the battery packs 12 utilizing a charging circuit 22. In the embodiment shown in FIG. 5, a control unit 24, which could be one of many different types of microprocessors or microcontrollers, is used to control the state of three individual switching elements 26a-26c. The state of each of the individual switching elements 26 is controlled by the control unit 24 through a control line 28. Although a single control line 28 is shown in FIG. 5, it should be understood that multiple control lines could be utilized or a single control line 28 could be utilized while operating within the scope of the present disclosure. In addition, the switching elements 26a-26c could be either a single element (MOSFET, IGBT, transistor, relay, etc.) or could be a combination to two switching devices, such as shown in FIGS. 8A-8C and described in detail below.

In one contemplated embodiment of the present disclosure, each of the switching elements 26 is a high current MOSFET that can transition between an open and closed position through a control commands from the control unit 28. Although a MOSFET is described in one embodiment as the switching element 26, it should be understood that different types of switching elements could be utilized while operating within the scope of the present disclosure.

As illustrated in FIG. 5, the first switch 26a is connected to the electrical contacts contained within the battery slot 18a to provide a connection between the battery pack 12a and ground. Switch 26b is positioned between the contacts in the battery slot 18b and ground to control the charging and discharging of the battery pack 12b. Finally, switch 26c is positioned in electrical connection with the battery slot 18c which receives the battery pack 12c. The control unit 24 is operable to selectively open and close each of the individual switches 26 as desired to control both the charging and discharging of the battery packs 12. Since the switches 26 are contemplated as being MOSFETS, the control unit 24 can open and close the switches 26 at rapid rates to selectively control the rate of charge from the charging circuit 22 or discharge to the motor 20.

A charging switch 30 is moved to the closed position during charging while the discharge switch 32 would be moved to the open position. Likewise, during discharge of the battery packs, the discharge switch 32 is moved to the closed position and the charging switch 30 is moved to the open position. The control unit 24 can also control the position of the switches 30, 32 to ensure that both of the switches 30, 32 are not in the closed position at the same time to prevent the charging circuit 22 from directly operating the electric motor 20.

Although the control unit 24 is shown in the embodiment of FIG. 4 as being contained within the battery tray 14, it should be understood that the control unit 24 could be located at other positions or locations, including inside one of the battery packs 12. However, positioning the control unit 24 within the battery tray 14 will allow the same control unit 24 to control the switches 26 during both charging and discharging of the battery packs 12.

In addition to controlling the position of the switches 26, the control unit 24 is also configured to monitor the state of charge on each of the battery packs 12 in a conventional manner. One method of monitoring the state of charge on each of the battery packs 12 is to monitor the voltage of the respective battery packs utilizing a voltage sensor. In an illustrative example, the maximum state of charge of the battery packs will be 82 volts. When the output of the battery pack 12 falls to 80 volts, the battery pack will be at 80% charge. However, the determination of state of charge based on battery pack voltage is dependent on battery types, battery configurations, and other parameters. Accordingly, state of charge will be determined based on the battery pack voltage, and other relevant factors associated with the battery pack. Percent of maximum change will be used in the following discussion to illustrate the charging and discharging control by the control unit 24. By monitoring the state of charge on each of the individual battery packs 12, the control unit 24 will be able to selectively control the discharge rate of each of the individual battery packs 12a-12c as well as control the rate of charge of the individual battery packs 12a-12c. In this manner, it is contemplated that the control unit 24 would be able to maintain each of the battery packs 12a-12c at the same state of charge during both the discharge and charging cycles.

In the embodiment shown in FIG. 5, each of the switches 26a-26c is a MOSFET that is positioned within the battery tray 14. However, it is contemplated that the MOSFET switch 26 could be moved into the individual battery pack 12 and be in communication with the control unit 24 through the individual battery slots 18. If the MOSFET switching element 26 were located within the battery pack 12 instead of within the battery tray 14, the MOSFET switch 26 would always move with the battery pack 12 rather than remaining within the battery tray 14. In another embodiment, both the battery pack 12 and the battery tray 14 could include switching elements.

Figure 6:
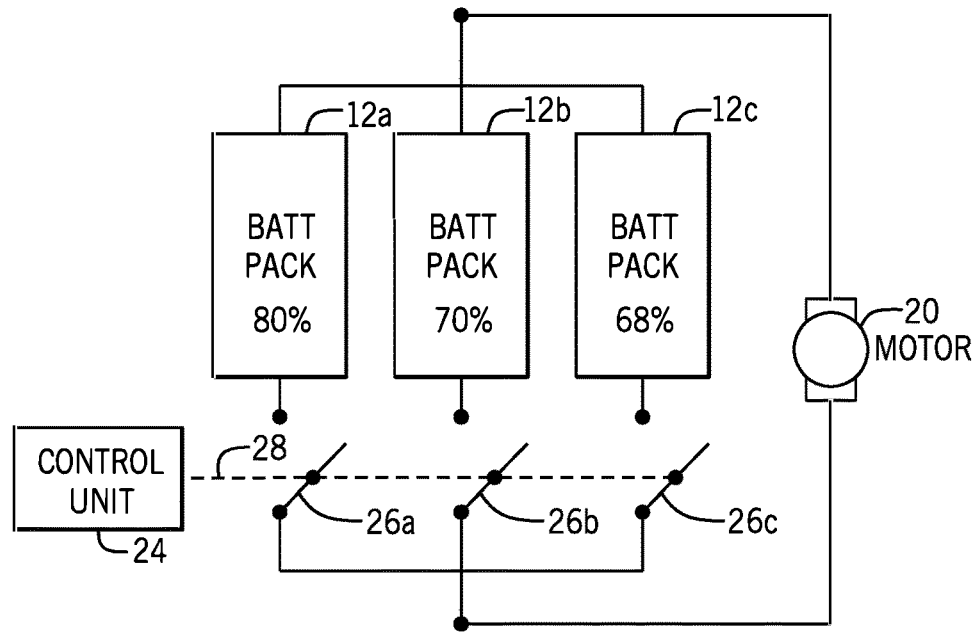
FIG. 6 illustrates the connection of the battery packs to an electric motor according to some embodiments.

Referring now to FIG. 6, thereshown is a schematic diagram illustrating the operation of the control unit 24 to selectively discharge the three battery packs 12a, 12b and 12c to drive the electric motor 20, according to some embodiments. In the embodiment illustrated, battery pack 12a is at 80% charge, battery pack 12b is at 70% charge while battery pack 12c is at 68% charge. This difference in the charge percentages of the battery packs could be due to unequal discharge rates or could be a result of one or more of the battery packs being removed from the battery tray for use with other equipment and later returned at a slightly more discharged state while the remaining battery packs were used to drive the lawn tractor.

In the embodiment shown in FIG. 6, the control unit 24 can control the opening and closing of the three MOSFET switches 26a-26c in order to control the discharge rates of each of the three individual battery packs 12a-12c. For example, the switch 26a would be closed for a greater amount of time as compared to the switch 26c until the state of charge of the battery pack 12a starts to decrease and gets closer to the state of charge of battery packs 12b, 12c. Once all three battery packs 12a, 12b and 12c reach the same state of charge (or within a threshold of each other), the control unit 24 can control the switches 26a-26c to all be in the same, closed position such that the three battery packs will provide the parallel-connected voltage source for the motor 20.

As a specific example, in the embodiment shown in FIG. 6, battery 12a would first be discharged to 70%. Once battery 12a reaches 70%, battery packs 12a and 12b would be discharged together until the state of charge on each of these two battery packs reaches 68%. Once in this state, all three battery packs would be discharged together. The control unit 24 can utilize any method of controlling the "open" or "closed" state of the switches 26a-26c to allow the battery packs 12a-12c to discharge to reach the level of the next lowest batter pack. One example method of controlling the state of the switches 26a-26c is to utilize pulse width modulation (PWM) on a control signal from the control unit 24 to selectively open and close the switches 26a-26c at the desired rate.

Figure 7:
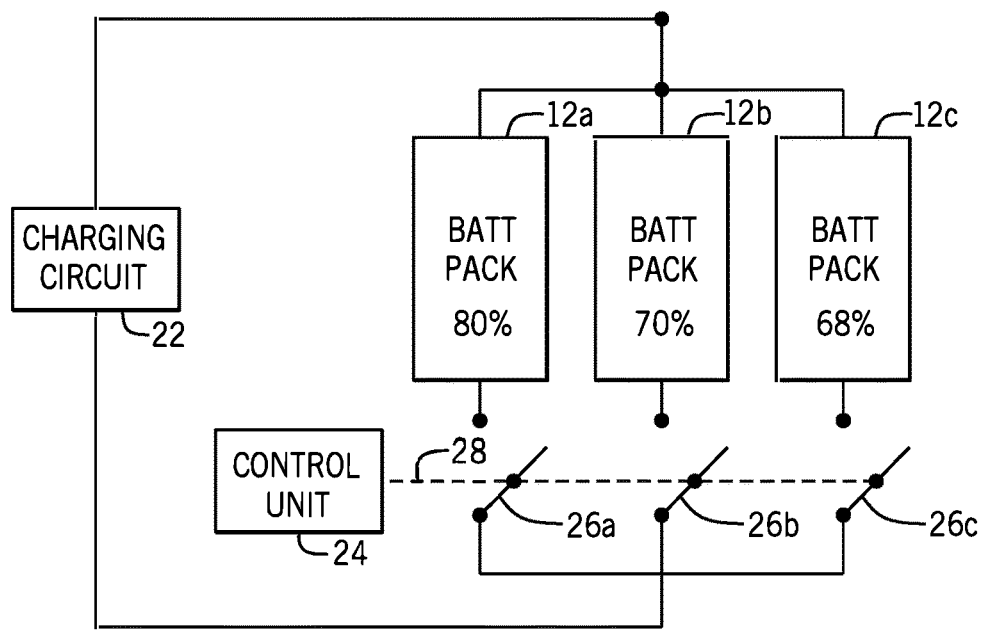
FIG. 7 is a schematic view illustrating the charging of the multiple battery packs according to some embodiments.

FIG. 7 is a schematic diagram illustrating a configuration in which the three battery packs 12a, 12b and 12c are connected to the charging circuit 22, according to one embodiment. In this embodiment, the control unit 24 would initially close switch 26c until the battery pack 12c is charged to 70%. Once the battery pack 12c reaches 70% charge, switches 26b and 26c are both closed until the battery packs 12b and 12c reach 80% charge. Once at 80% charge, all three of the switches would be closed and all three battery packs charged until they reach 100% of their rated capacity. By charging the battery packs in this balanced manner, the battery pack with the highest charge is not connected to the charging circuit 22 until the remaining battery packs reach the level of charge of the highest battery packs. All of the battery packs will then be charged to 100%, which reduces the strain on the batteries during the charging and discharging cycles.

It is contemplated that the control unit 24 could control the discharge of the three battery packs to either maximize performance or to maximize longevity. This selection could be presented to the user through a switch or selection device on the tractor as another feature of the tractor.

Although the embodiments shown in FIGS. 5-7 illustrate three battery packs connected in parallel, it is contemplated that additional battery packs could be utilized while operating within the scope of the present disclosure. For example, if a larger vehicle were driven by the electric power unit, one or more additional battery packs could be connected in the parallel arrangement to increase the output power of the combined unit. Adding an additional battery pack in parallel with the three battery packs shown in FIGS. 5-7 will both increase the run-time and will slightly increase the voltage created by the parallel connected battery packs. The addition of battery packs in parallel will also increase the available power (increased current availability), which will increase runtime. The additional battery packs connected in parallel will also allow the output voltage to remain at the desired level for a longer period of time.

In the embodiments shown in FIGS. 5-7, each of the battery packs has a maximum DC voltage level, which could be different based on the type and size of battery pack being used (for example 80 volts, 100 volts, 120 volts). In the embodiments illustrated, each of the battery packs includes a number of lithium-ion cells arranged to output a DC current at a desired voltage level. However, different types of battery cells, such as NiCd, lead acid, and the like are also contemplated as being within the scope of the present disclosure.

In addition to the charging and discharging of the individual battery packs, the control unit 24 could also be configured to communicate with the individual battery packs to limit the amount of current output from each of the battery packs. In such an embodiment, each individual battery pack would have internal circuitry configured to control the output of the battery pack. By communicating between the control unit 24 and the internal control circuits of each of the battery packs 12, the system of the present disclosure would be able to not only control the charging and discharging rates of the individual battery packs, but also control the current output of each of the individual battery packs. This would allow the battery packs to be used with different types of equipment that may have different power requirements. In some embodiments, the internal control units may include one or more electrical switches to regulate the output current of the individual battery packs. For example, the internal control units may include one or more MOSFET switches, which can be modulated via a control signal from the control unit (e.g. via a PWM signal) to regulate the output current of the individual battery pack.

In yet another contemplated embodiment, each of the battery packs could be designed to include control circuitry and the control unit 24 in the battery tray could be eliminated. In such an embodiment, one of the battery packs would be designated as the "master" and the remaining battery packs would operate as "slaves". The battery packs would communicate with each other through the battery trays or direct connections and each battery pack would include the required switching elements such that the master battery pack would control the charging and discharging of the battery packs. Although such an embodiment would increase the complexity, and thus the cost, of the individual battery packs, it would allow the battery packs to have operative controls in every use, not just in the vehicle including the control unit 24 and battery tray. Further details and discussion concerning this alternate embodiment will be described below with reference to FIGS. 9-11.

In the embodiment shown in FIG. 7, the charging circuit 22 is shown connected to each of the individual battery packs. However, if the battery packs were not connected to the charging circuit 22, the control unit could selectively control the position of each of the MOSFET switches 26a-26c such that the battery pack 12a having the greatest state of charge could be used to charge the other battery packs 12b, 12c until all three of the battery packs would have the same charge. In this manner, the control unit would again be able to control the position of the MOSFET switches 26a-26c in order to balance the charge states of the individual battery packs 12a-12c to increase the effectiveness of discharge when connected to the electric motor 20. Although MOSFET switches 26a-26c are each shown as a single switch in the embodiment of FIGS. 5-8, the single switch could be replaced by two or more switches in series, as will be shown and discussed with reference to FIGS. 8A-8C.

As previously described, any one of the three battery packs 12a-12c can be removed from the battery tray 14 and used to power other types of outdoor power equipment. For example, it is contemplated that the battery packs 12a-12c could be utilized to power other types of equipment, such as weed trimmers, snow throwers, edgers, leaf blowers, power washers, push mowers or any other type of outdoor power equipment that could be configured to operate on electric power. Since each of the battery packs 12a-12c is of relatively large capacity, only one of the individual battery packs may be required to operate smaller equipment. In one example, the three battery packs 12 shown in FIG. 2 would be combined to provide electrical operating power for a larger lawn tractor. The owner of the lawn tractor could thus utilize the battery packs 12 to power other types of outdoor equipment configured to receive power from the battery packs 12 without the need to buy additional battery packs.

FIGS. 8A-8C illustrate yet another embodiment for controlling the discharge rates of a pair of battery packs. In the embodiment shown in FIGS. 8A-8C, battery pack 40 has a state of charge of 82 volts while the second battery pack 42 has a state of charge of 80 volts. These two voltage values are being used for illustrative purposes only and other charge values could exist for the two battery packs shown. It should also be understood that more than two battery packs could be used and controlled using the method to be described.

Each of the two battery packs 40, 42 includes a charging switch 44 and a discharging switch 46. In one embodiment, the switches 44, 46 are MOSFET switches; however, other electrical switches are also contemplated. As discussed previously, if the pair of battery packs 40, 42 are connected in parallel, the battery pack 40 having a higher state of charge provides current not only to the load but also to the battery pack 42 having a lower state of charge in an attempt to charge the battery pack 42. In order to prevent the battery pack 40 from charging battery pack 42, the embodiment of FIGS. 8A-8C includes both charging switches 44A-44B and discharging switches 46A-B. In general, the discharge switches 46A-B are configured to let current flow from the respective battery pack when the switches 46A-B are closed or energized, while the charging switches 44A-B are configured to allow current to flow into the respective battery pack when the switches 46A-B are in a closed or energized condition. In one embodiment, the charging switches 44A-B and the discharge switches 46A-B are MOSFET switches; however, other electric switches are also contemplated.

FIG. 8A is a schematic diagram illustrating an operation in which both of the battery packs 40 and 42 can discharge to the DC voltage bus 43. To discharge the battery packs 40 and 42 to the DC voltage bus 43, a control unit, such as control unit 24 described above, provides a control signal to the control terminals 45 of the switches 44, 46 such that the charging switch 44A and the discharging switch 46A for the first battery pack 40 are switched "on" to allow current flow through the switches 44A and 46A. At the same time, the control unit provides a control signal to turn "on" the discharging switch 46B for the second battery pack 42. The charging switch 44B is left in an "off" condition. In the configuration described above, both of the battery packs 40, 42 can discharge onto the DC bus 43 because both of the discharge switches 46A and 46B are in the "on" condition, thereby allowing current flow from the battery packs 40,42 to the DC voltage bus 43. Battery pack 42 cannot be charged by the battery pack 40, which has a higher state of charge, since the charging switch 44B is in the off position. The control unit selectively controls the on and off condition of each the switches 44A-B, 46A-B through voltage monitoring and signals applied to the terminal 45 of each of the switches. The control unit determines the state of charge of each of the number of battery packs available and turns "on" the charging switch for only the battery pack having the highest state of charge. The charging switch for the other battery packs are then turned "off" to prevent charging between the battery packs in this embodiment.

In the embodiment shown in FIG. 8B, it is now desired to charge the battery pack 42 to bring the voltage of the battery pack 42 into alignment with battery pack 40. In this condition, the charging circuit, such as charging circuit 22 described above, is connected to the voltage bus 43. The control unit operates to turn off both the charging switch 44A and the discharging switch 46A connected to the battery pack 40. At the same time, the charging switch 44B, connected to the battery pack 42 having a lower voltage than battery pack 40, is turned on. The discharging switch 46B is turned "off" such that current can only flow from the charging circuit connected to the voltage bus 43 to the battery pack 42. The embodiment in FIG. 8B illustrates charging battery pack 42 to bring the charge on the battery pack 42 to match the charge on battery pack 40, but both battery packs 40, 42 could be charged if desired. Once again, the control unit can selectively control the on and off positions of the charging and discharging switches to selectively charge or discharge the battery packs 40,42.

FIG. 8C is a schematic diagram illustrating another operating condition in which the control unit is configured to operate in a balanced voltage mode. The balanced voltage mode discharges the battery packs in an attempt to match the voltage levels on the packs. In the balanced voltage mode, the control unit turns on both the charging switch 44A and the discharging switch 46A connected to the battery pack 40 having the higher voltage level. In one embodiment, the control circuit is configured to determine which battery pack has the highest voltage level, or charge, within a group of battery packs. Thus, while the example shown in FIG. 8C discharges battery pack 40, battery pack 42 may be discharged by the control circuit where the battery pack 42 has a higher voltage or charge than the battery pack 40. In the embodiment shown in FIG. 8C, the battery pack 40 can discharge to the voltage bus 43 to drive a load. Since the battery pack 42 has a lower voltage than the battery pack 40, the control unit is configured to turn off the discharge switch 46B and turns on the charging switch 44B. In this condition, a charging current can flow from the voltage bus 43 to the battery pack 42 to bring the voltage of the battery pack 42 into closer alignment with the battery pack 40. Once the battery packs 40 and 42 become balanced, the control unit can change the state of the charging switches 44A-B and discharging switches 46A-B.

As can be understood by the embodiments shown in FIGS. 8A-8C, the use of a pair of switches to control charging and discharging from each of the battery packs allows the control unit to change the charging and discharging state of each of the battery packs individually.

In yet another contemplated embodiment, different electric motors on the vehicle or lawn tractor could be powered by different power buses. As an illustrative example, the vehicle or lawn tractor may include one or more blade motors associated with a mowing attachment. The blade motors may be powered by a first power bus while the traction motors used to propel the lawn tractor may be powered by a second power bus. The control unit contained within the battery tray may be configured to analyze the state of each of the batteries in the battery tray and decide which bus (or load) each battery or batteries should be coupled to maximize power and/or run time. For example, where the blades require additional power, such as when the grass is thick or damp, the control unit may use a battery or batteries with higher charge to power the blade motors, and use a battery with less charge to power the traction motors. However, in other embodiments, the control unit may determine that additional power is required by the traction motors, and couple a battery or batteries with higher charges to the traction motors. In this manner, the control unit could optimize the use of the batteries based upon the type of load being driven by the battery through the multiple power buses.

Figure 9:
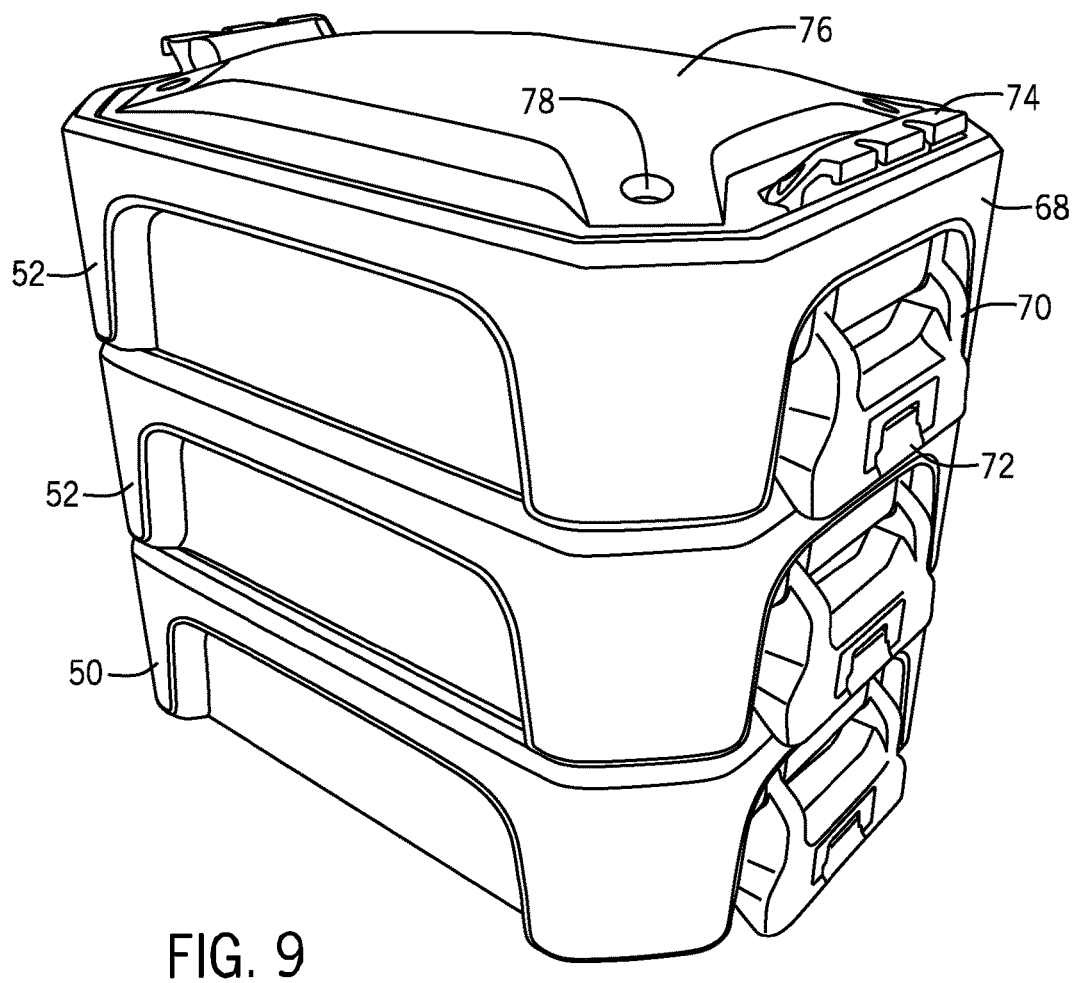
FIG. 9 is a perspective view of an alternate embodiment of the scalable power unit incorporating multiple stacked battery packs according to some embodiments.
Figure 10:
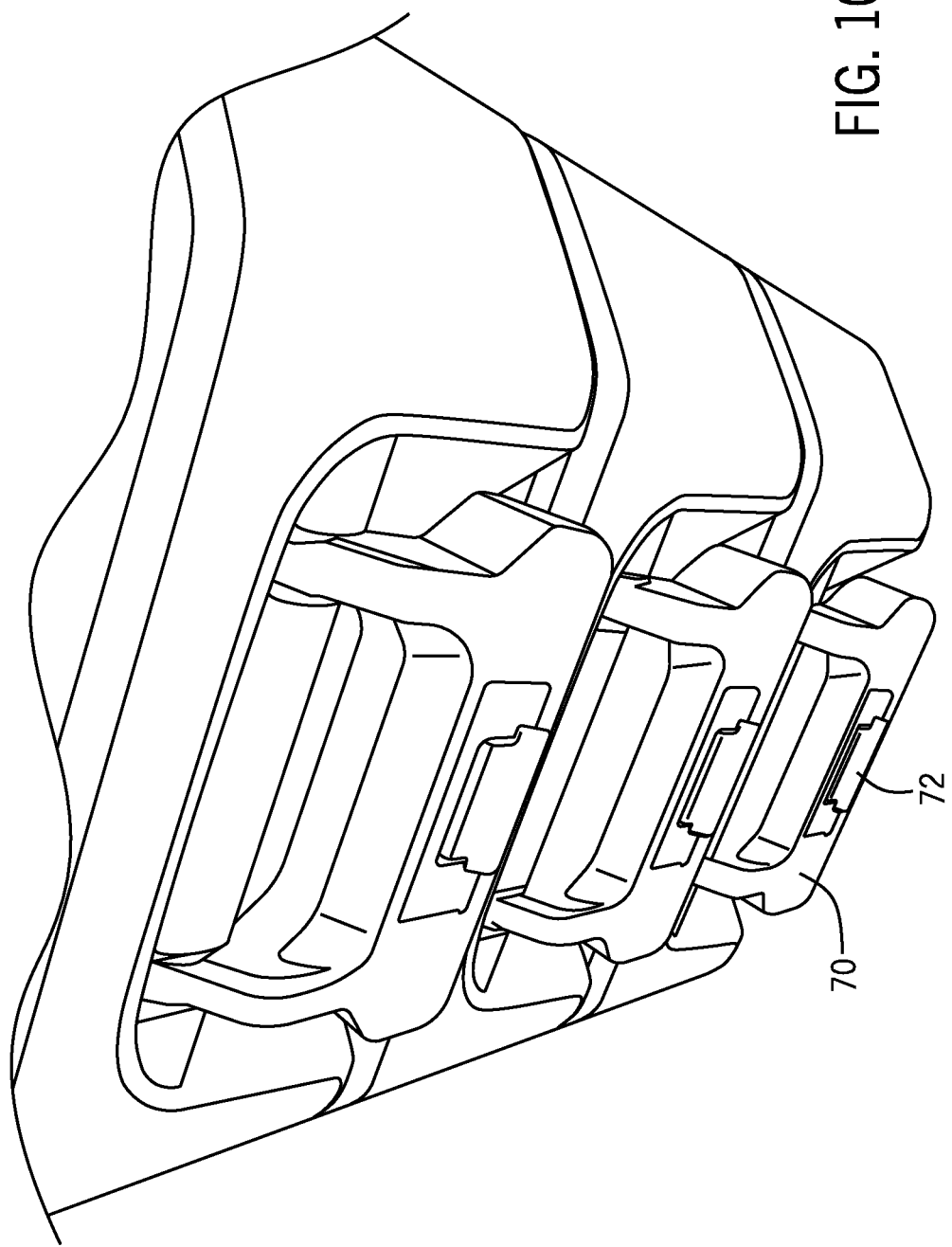
FIG. 10 is a perspective view of the locking handles between the multiple stacked battery packs according to some embodiments.
Figure 11:
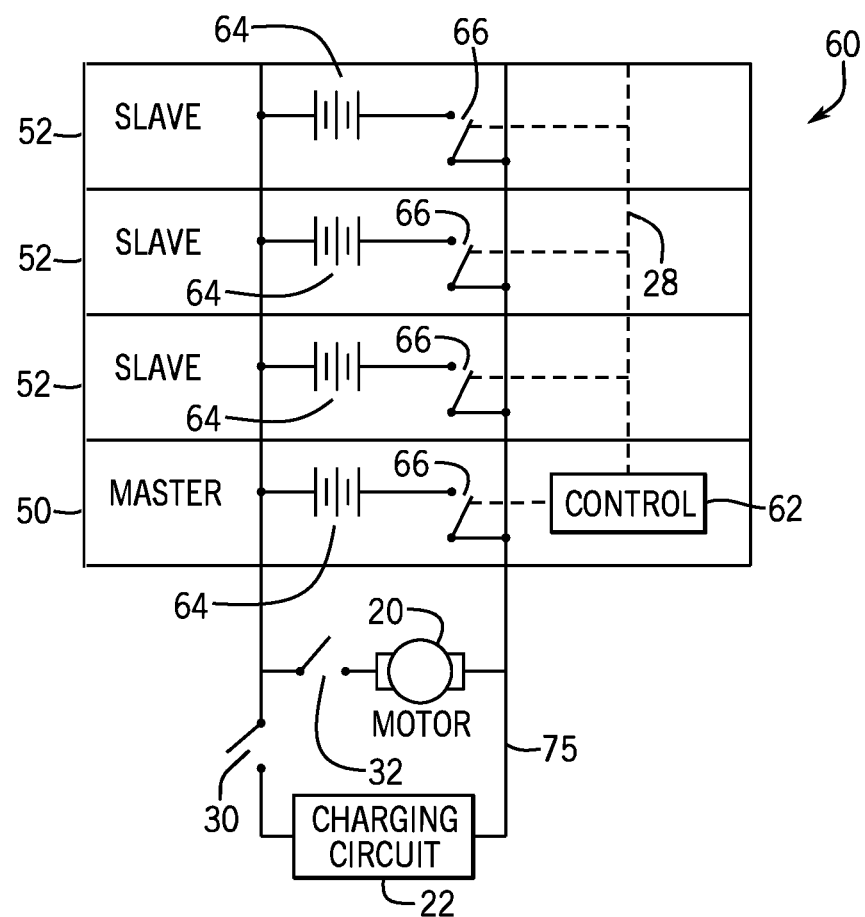
FIG. 11 is an electrical schematic illustration of the connections between the multiple stacked battery packs including master and slave battery packs according to some embodiments.

In yet another contemplated embodiment, such as shown in FIGS. 9-11, one or more of the battery packs could be manufactured to include control circuitry and a control unit in the battery tray could be eliminated. The embodiment shown in FIGS. 9-11 operates in the same manner as the embodiments described above, but the physical location of the control unit and the switching elements has been modified.

In the alternate embodiment of FIGS. 9-11, one of the battery packs 50 would be designated as the "master" and the remaining battery packs 52 would operate as "slaves". The battery packs would communicate with each other either through a physical connection or using a wireless communication technique and each battery pack would include the required switching elements such that the master battery pack 50 would control the charging and discharging of the battery packs 52. In an embodiment that incorporates wireless communication, each of the battery packs 52 would include a wireless transceiver such that the battery packs 52 could communicate with each other using short range wireless protocols, such as Bluetooth or other communication protocols. The wireless transceiver can communicate control commands to open and close the connection switches and to relay voltage levels for each of the battery packs, along with other information that may be relevant. In yet another contemplated embodiment, each of the battery packs could have the same internal components and thus could be configured to be either the "master" or one of the "slaves". In such an embodiment, all of the battery packs would communicate through a communication bus. The embodiment shown in FIG. 11 illustrates the control unit 62 communicating over the control line 28 to the series of switches 66. The same control line 28 could be replaced by a communication bus in an embodiment in which each of the battery packs 52 includes some type of control unit. The communication between the battery packs would allow the battery packs to recognize the state of charge of each battery pack, and each battery pack could selectively turn on or off to balance the state of charge on the battery packs during usage. Similarly, the batteries could also communicate state of charge, as well as other information such as the voltage level of the battery pack, estimated amp hours remaining, over the communication bus when being charged.

Referring now to FIG. 11, a block diagram illustrating one example of an electric power unit 60 constructed in accordance with the alternate embodiment is shown. In the embodiment shown in FIG. 11, the electric power unit 60 includes the master battery pack 50 and a series of slave battery packs 52. In the embodiment shown, the master battery pack 50 includes a control unit 62 that is similar to the control unit 24 shown in the embodiment of FIG. 5. Each of the batteries, including the master battery pack 50 and the slave battery packs 52, includes a series of battery cells 64 and an internal switch 66. As with the previous embodiments, each of the switches 66 may be a MOSFET switch that is located within the outer housing of the individual battery packs. The control unit 62 is connected to a similar control line 28 such that the control unit 62 can control the state of each of the individual switches 66. In one embodiment, the switches 66 may each include a pair of MOSFETs, as shown and described in FIGS. 8A-8C. In this manner, the control unit 62 is able to control the application of power to the electric motor 20 or some other type of load in the same manner as previously discussed.

Referring now to FIGS. 9 and 10, each of the individual battery packs is designed with an outer casing 68 such that the individual batteries 52 can be stacked on top of each other as illustrated. Each of the outer casings 68 includes a locking handle 70 that allows the individual battery packs to be locked together to form the stack shown in FIG. 9. Each of the locking handles 70 includes a release tab 72 that can be released by a user to allow the individual battery packs to be separated as desired. The handle 70 engages a locking tab 74 located near the top surface 76 of the battery pack located immediately below in the stack of battery packs.

As can be understood in the embodiments shown in FIGS. 9 and 10, the battery packs can be connected to each other to form a stable and secure stack without the use of any tools. In the embodiment described, the outer casing 68 is formed from a hard, durable plastic material such as used in Pelican™ cases. The durable outer casing 68 would protect the internal operating components of the battery pack and allow the stacked battery packs to be used in work environments that may be subject to dirt, moisture and other contaminants.

The top surface 76 includes a series of spaced connector ports 78 that allow the individual battery packs to be electrically connected when stacked as shown in FIGS. 9 and 10. The connector ports 78 create not only the electrical connections between the individual battery cells 64 and the electrical switches 66 but also function to allow electrical signals to travel from the control unit 62 to each of the individual switches 66, as can be understood in FIG. 11. In this manner, when the individual battery packs 52 are stacked as shown in the illustration of FIG. 11, the control unit 62 can control the state of each of the individual switches 66 to connect the battery cells 64 in parallel to provide power to the electric motor 20. In the embodiment shown in FIGS. 9 and 10, the individual switches 66 shown in FIG. 11 may be included in each of the individual battery packs since the tray connection shown in the embodiment of FIG. 5 would be eliminated and the battery packs would be connected to a power bus bar 75 that extend through the stack of battery packs 52.

The control unit 62 is able to operatively control the state of the individual MOSFET switches 66 to control the discharge and charging of the battery packs as described in detail previously. Unlike the previously described embodiments, the switches 66 are contained in each of the slave battery packs 52 and the master battery pack 50. As shown in the embodiment of FIG. 11, the control unit 62 is located in the master battery pack 50 only. However, in some embodiments, each battery pack 50, 52 may include a control unit 62. Where multiple battery packs 50, 52 include a control unit 62, one battery pack may be selected as the master battery pack, such that the control unit 62 of the master battery pack 50 controls the state of the switches in the slave battery packs 52

In one contemplated implementation of the scalable power unit 60 shown in FIG. 11, the master battery pack 50 could be permanently installed on the vehicle and only the slave battery packs 52 would be removable. In this manner, the master battery pack 50 would remain with the vehicle at all times and additional slave battery packs 52 could be added and removed as desired in order to extend the use time of the vehicle. The slave battery packs 52 could be removed and used on other power equipment as was previously described above.

In other contemplated embodiments, all of the battery packs could be removable from a vehicle and transferred to either another vehicle or other type of equipment. In such an embodiment, the control unit 62 could determine the type of vehicle or equipment and operate the switches 66 accordingly. It is contemplated that the vehicle or equipment would have some type of electronic or physical indicator that can be sensed by the control unit 62 included in the battery pack. As an illustrative example, the battery receptacle of a lawn tractor could include a resistor, the value of which could be sensed by the control unit, to determine that the battery pack is being used with a lawn tractor. Other equipment and vehicles could then have resistors of different values to allow the control unit to identify the current use of the battery pack.

Although the master battery pack 50 and slave battery packs 52 appear identical in the embodiments shown in FIGS. 9 and 10, it is contemplated that the master battery pack 50 could be differentiated from the slave battery packs 52 by one or more differentiators. Example differentiators may include color coding or other types of visual indication or branding to indicate to an owner/operator which of the battery packs is the master battery pack 50. Since the master battery pack 50 may be the only battery pack that includes the control unit 62, in some embodiments, the master battery pack 50 may be required to be included in the stack for the system to operate.

Figure 12:
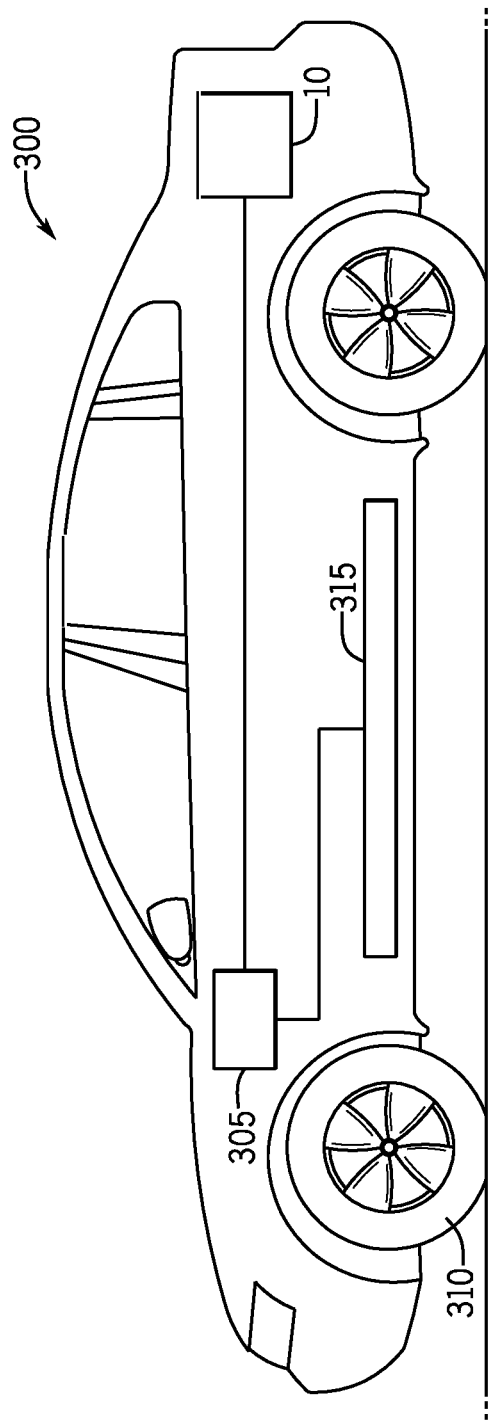
FIG. 12 is a schematic view of a vehicle including the scalable power unit according to some embodiments.

Referring to FIG. 12, a vehicle 300 including the scalable power unit 10 is illustrated according to one embodiment. For an automobile or other large vehicle, the scalable power unit 10 may be used to supplement the main power supply of an electric or hybrid drive system. The vehicle 300 may also include an electric or hybrid drive system 305 for powering one or more drive wheels 310. In one embodiment, a primary vehicle battery 315 supplies power to the drive system 305. The primary vehicle battery 315 can be charged by a generator driven by an internal combustion engine of a hybrid drive system, by regenerative braking, by connecting the vehicle battery 315 to the electrical grid, or other known methods for charging the vehicle battery of a hybrid or electric vehicle. Where the vehicle is a small utility or all-terrain vehicle, the scalable power unit 10 may serve as the primary power supply for the vehicle.

The scalable power unit 10 may be included in the vehicle 300 to provide the user with the ability to add to the available energy capacity of the primary vehicle battery 315. For example, the user is able to add charged battery packs as needed to extend the range of the vehicle 300. This may be done at home before leaving for a trip or charged battery packs may be available at service stations or other locations so that a user with a vehicle approaching the end of its range is able to quickly add charged battery packs or exchange the depleted battery packs for charged battery packs at a service station. In this way, the user of an electric vehicle is not subjected to the wait necessary to utilize a charging station at home or at a service station to charge the primary vehicle battery 315 of the vehicle 300. For example, exchange system for depleted battery packs could work similar to known propane gas tank exchange systems. In another embodiment, by utilizing the scalable power unit 10, a user of a hybrid vehicle may be able to reduce the need to operate the internal combustion engine to either power the drive wheel 310 or charge the primary vehicle battery 315, thereby reducing fuel consumption. As illustrated in FIG. 12, the scalable power unit 10 is directly electrically connected to the drive system 305. Alternatively, the scalable power unit 10 could be directly electrically connected to the main vehicle battery 315 and provide power to charge the primary vehicle battery 315, which in turn is available for use by the drive system 305. As illustrated in FIG. 12, the scalable power unit 10 is located in the trunk of the vehicle 300. In other embodiments, the scalable power unit 10 may be located in other locations easily accessible to the user, including under the hood of the vehicle or in the bed of a pickup truck.

Figure 13:
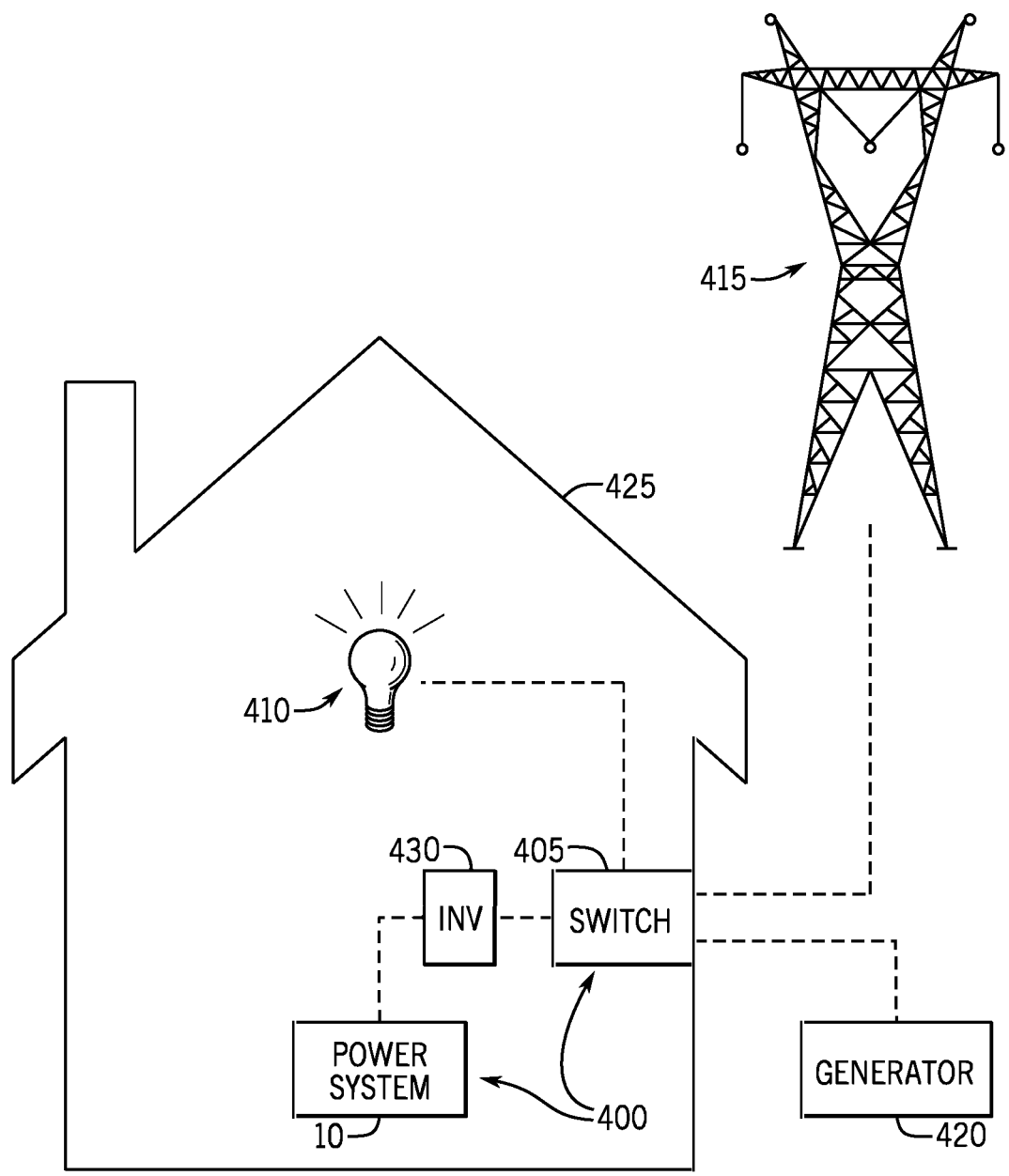
FIG. 13 is a schematic view of a backup power supply including the scalable power unit according to some embodiments.

Referring to FIG. 13, a backup power supply 400 for a home or small building can include the scalable power unit 10. The backup power supply 400 may be used for a building (e.g., a home) either in combination with a generator, or on its own to supply backup power during electrical outages.

The backup power supply 400 includes a transfer switch 405 to manage power distribution. The transfer switch 405 is electrically coupled to the scalable power unit 10 so that power from the battery packs of the scalable power unit 10 may be distributed through the transfer switch 405. The transfer switch 405 may automatically switch between the various power sources it is connected to (e.g., the electrical grid, the scalable power unit 10, etc.) or may be manually switched between the various power sources. The scalable power unit 10 is also communicatively connected (e.g., wired or wirelessly) to the transfer switch 405 to monitor operation of the scalable power unit 10 and provide control signals to the scalable power unit 10 to operate the power unit 10.

The transfer switch 405 includes a controller programmed to monitor and control operation of the scalable power unit 10 and other power sources connected to the transfer switch 405 and to monitor and control distribution of power from the transfer switch 405 to one or more loads 410 electrically connected to the transfer switch by one or more electrical circuits. In the illustrated embodiment, the electrical grid 415 and a generator 420 are electrically connected to the transfer switch 405. The generator 420 includes an internal combustion engine that drives an alternator to produce electricity. The load 410 is illustrated as being inside a house 425. In other embodiments, the backup power supply 400 provides power to other types of buildings, including commercial buildings, retail buildings, garages, and multi-family residences.

In the illustrated embodiment, the home owner is able to scale the energy capacity of the scalable power unit 10 to meet his/her needs for possible power outages from the electrical grid 415. Different home owners have different priorities for the loads 410 and related circuits that need to be powered in the event of a power outage. A first user may only wish to keep a refrigerator powered, while a second user may wish to also keep an air conditioner powered. The first user would need less available power than the second user to power the desired loads for a certain amount of time. Additionally, the backup power supply 400 is able to provide a nearly instantaneous switchover in the event of a power outage. For a house 425 also equipped with a generator 420, the backup power supply 400 can provide power immediately following a power outage from the electrical grid 415 while the engine of the generator 420 starts and the alternator of the generator 420 begins to produce electricity. A standby generator 420 may take between 10 and 30 seconds to start to supply power following a power outage from the electrical grid 415. Also, air conditioners or other equipment may have restart timers that prevent attempts to restart the equipment for a set time period following a shutdown due to a power outage. For example, some air conditioners require a wait of five to ten minutes before restarting is allowed. For a home equipped with a standby generator, the standby generator will likely not start in time to avoid shutting down the air conditioner, leaving the home without air conditioning for the duration of the restart timer. In contrast, in the house 425 equipped with the backup power supply 400 and the generator 420, the backup power supply 400 supplies nearly instantaneous power to the air conditioner while the generator 420 is starting, thereby preventing shut down of the air conditioner and initiating the restart timer, and the generator 420 is able to supply power for the air conditioner after it is running in its normal operating condition. In this way, the backup power supply 400 functions as an uninterrupted power supply or UPS. A UPS system can also provide continuous power to critical electrical systems, like computers and medical equipment (e.g., oxygen or breathing assistance systems). Also, starting the generator 420 could be delayed based on duration of time or amount of power available from the backup power supply 400, so that power outages of short durations are handled solely by the backup power supply 400 without having to operate the generator 420. This would eliminate the noise caused by operation of the generator 420 during a short power outage. Additionally, the controller of the transfer switch 405 can be programmed to implement a peak shaving power distribution system by tracking the cost of the energy used to charge the battery packs connected to the base of the backup power supply 400 and comparing it to the cost of the energy being supplied by the electrical grid 415 and the cost of energy produced by the fuel used to power the generator 420 (e.g., natural gas) and can use the lowest cost source of energy in an effort to save overall energy expenses for the home owner.

Additionally, the backup power supply 400 may also be used as a charging station for the battery packs 12 to be used with other equipment (e.g., one or more pieces of outdoor power equipment, a vehicle, etc.). For example, when not using the lawn tractor 13 or the vehicle 300, the user may attach the battery packs to the backup power supply 400 to both charge the battery packs 12 and make the battery packs 12 available for use by the backup power supply 400 in the event of a power outage. When needed for use in the lawn tractor 13 or the vehicle 300, a battery pack 12 can be removed from the charging base of the backup power supply 400 and used as needed to power the lawn tractor 13 to mow the lawn or extend the range of the vehicle 300. A DC to AC inverter 430 is positioned between the scalable power unit 10 and the transfer switch 405 to convert the DC power output from the battery packs to an AC power output capable of powering the AC loads in the house 425.

Figure 14:
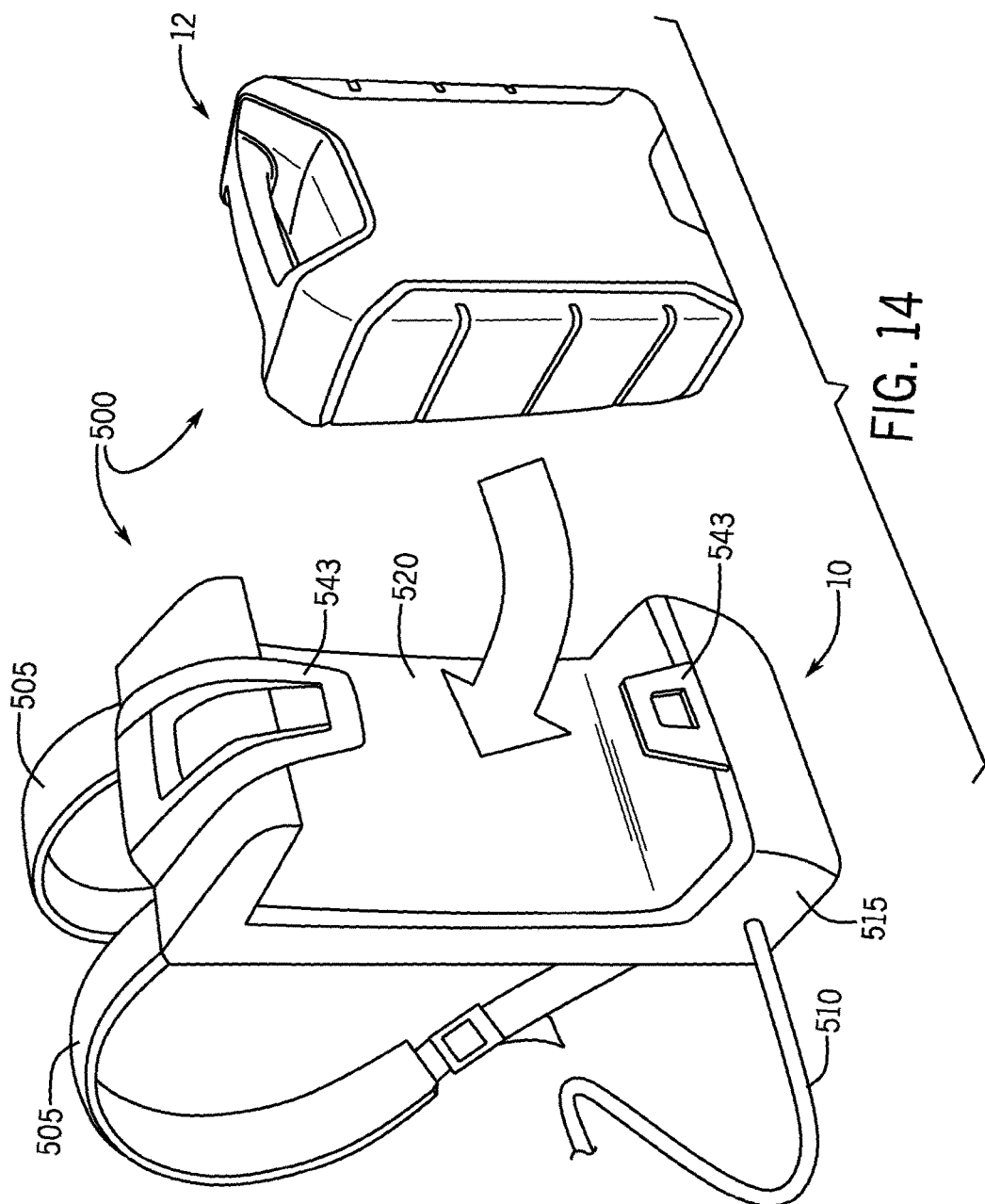
FIG. 14 is an exploded view of a stand-alone power supply including the scalable power unit according to some embodiments.
Figure 15:
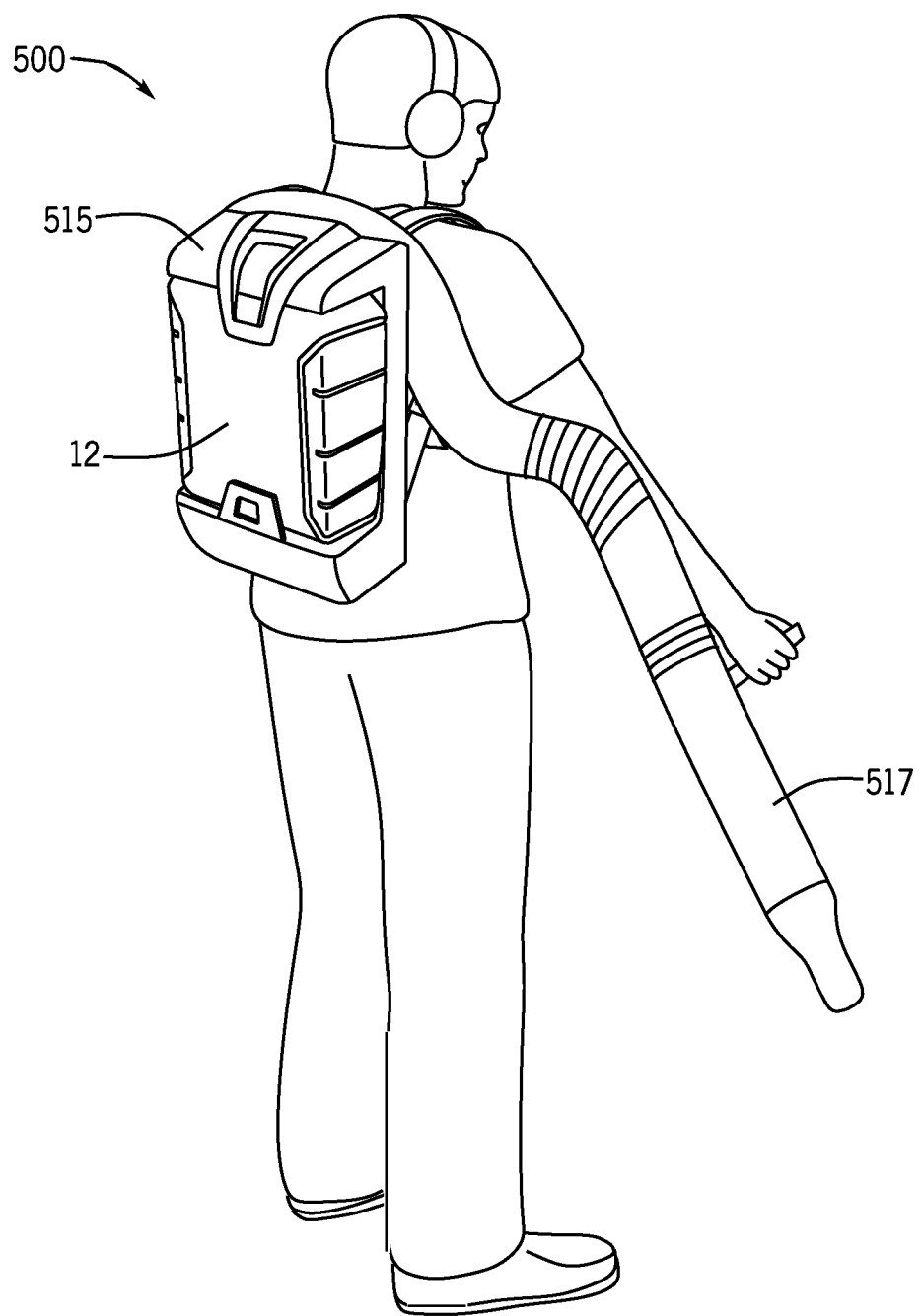
FIG. 15 is a perspective of the power supply of FIG. 14 powering a leaf blower according to some embodiments.

Referring to FIGS. 14-15, a stand-alone power supply 500 including the scalable power unit 10 is illustrated according to one embodiment. The power supply 500 may be able to supply power to devices of the user's choosing (e.g., via one or more standard electrical outlets) or may be designed for use to power a particular piece or family of equipment (e.g., hand-held power tools such as leaf blowers, string trimmers, etc.). As with the embodiment shown in FIG. 13, a DC to AC inverter (not shown) is included as part of the stand-alone power supply 500 to allow devices that typically run on AC power to be operated with the standalone power supply 500.

Power supply 500 includes a base 515 that includes at least one receptacle 520. As illustrated, the receptacle 520 is configured as part of a backpack having the base 515 and straps 505 that allow a user to carry the power supply 500 on his/her back. In some embodiments, due to weight limitations, a backpack power supply 500 includes a single receptacle 520 for receiving only a single battery pack 12. The base 515 may include one or more locking mechanisms 543 to secure the battery pack 12 to the receptacle 520. As illustrated, the power supply 500 includes a cord 510 for providing power to a hand-held power tool 517, illustrated as a leaf blower. The distal end of the cord 510 would include a connection device that connects to where a standard battery connection would be on the leaf blower. Alternatively, or additionally, the power supply 500 can include one or more standard electrical outlets, allowing the user to plug in and power electrical devices of his/her choosing (e.g., computers, laptops charging systems for cell phones or other portable devices, radios, etc.). In such an embodiment, the base 515 would include a DC to AC inverter to create the AC power output needed to power such devices.

Figure 16:
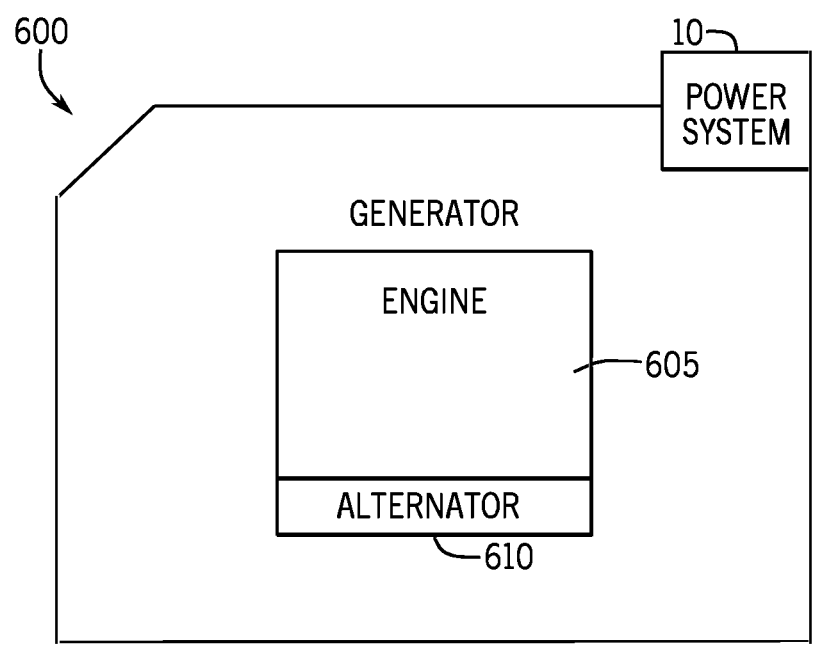
FIG. 16 is a schematic view of a portable generator including the scalable power unit according to some embodiments.

Referring to FIG. 16, a portable generator 600 including the scalable power unit 10 is illustrated according to one embodiment. The portable generator 600 includes an engine 605 that drives an alternator 610 to produce electricity. Running the engine 605 creates noise that can be a nuisance for a user, or others (e.g., when operated at night, when operated while camping, when operated near a group of people, etc.). Including the scalable power system 100 in the portable generator 600 provides a source of energy that is available to the user without running the engine 605. For example, a user could use the scalable power unit 10 to power a light at night while camping without the noise associated with running the engine to power the same light with the alternator 610. In some embodiments, the portable generator includes a charging system by which electricity generated by the alternator 610 is used to charge the battery module(s) of the scalable power unit 10. Since the scalable power unit 10 provides a source of DC voltage, a DC to AC inverter would be used in connection with the scalable power unit 10 to provide the required AC power output needed to power devices through the outlets available on the portable generator 600

Figure 17:
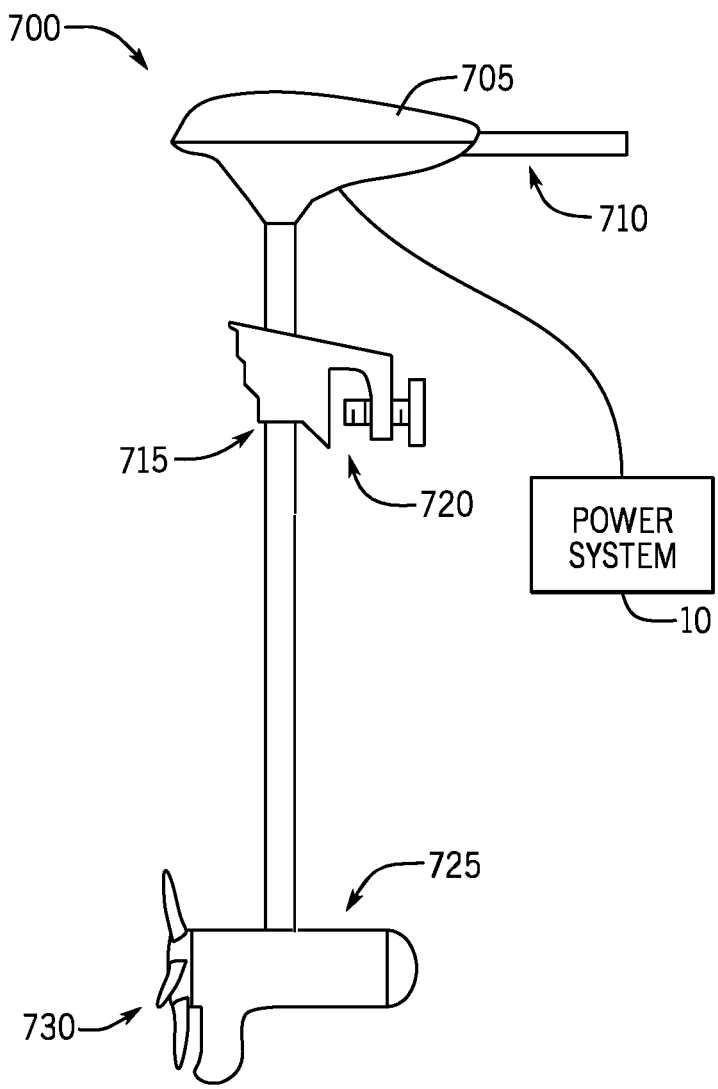
FIG. 17 is a schematic view of a trolling motor including the user scalable power unit according to some embodiments.

Referring to FIG. 17 a trolling motor 700 including the scalable electric power unit 10 is illustrated according to one embodiment. The trolling motor 700 includes a head 705 having a tiller 710 for rotating a shaft 715 relative to a support or attachment member 720. However, in some examples the trolling motor 700 may include an electronic drive mechanism for rotating the shaft 715 to provide steering control. A drive unit including an electric motor 725 and a propeller 730 is attached to the shaft 715 opposite the head 705. The scalable power unit 10 can be located remotely from the rest of the trolling motor 700 as illustrated or can be integrated into another component of the trolling motor (e.g., the support 720). The scalable power unit 10 can be used to power other electrical equipment onboard a boat, including lights, an anchor winch, a fish finder, and a fish well aerator.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A riding lawn mower comprising:
   a pair of rear drive wheels;
   a pair of front wheels;
   a deck positioned between the pair of front wheels and the pair of rear drive wheels;
   a rotatable cutting blade;
   a plurality of battery packs removably coupled to the riding lawn mower and structured to provide power to the riding lawn mower, each battery pack graspable and removable by a user; and
   a battery management system configured to control a plurality of switching elements associated with the plurality of battery packs, wherein the plurality of switching elements are movable between an open position and a closed position to control a current flow from each of the plurality of battery packs to the riding lawn mower, wherein the battery management system is configured to maintain a balanced state of charge between the plurality of battery packs by reducing a current drawn from one of the plurality of battery packs having a lowest state of charge, wherein the current drawn from one of the plurality of battery packs is reduced by selectively moving one or more of the plurality of switching elements to the open position, and wherein the battery management system comprises a master battery management system configured to issue control commands to a plurality of slave battery management systems, wherein each of the plurality of slave battery management systems is configured to internally control operation of one of the plurality of battery packs,
   wherein the plurality of battery packs sequentially provide power to the riding lawn mower.

2. The riding lawn mower of claim 1, wherein the plurality of switching elements are MOSFETs, and wherein the MOSFETs are positioned within a battery tray on the riding lawn mower, wherein the battery tray is configured to selectively receive the plurality of battery packs.

3. The riding lawn mower of claim 1, wherein each of the plurality of battery packs include a handle configured to allow the user to move at least one of the plurality of battery packs.

4. The riding lawn mower of claim 1, wherein each of the plurality of battery packs includes a plurality of groups of a plurality of rechargeable battery cells, wherein the plurality of rechargeable battery cells within a common group are connected in series, and wherein each of the plurality of groups of the plurality of rechargeable battery cells are connected to at least one other group of the plurality of groups of the plurality of rechargeable battery cells in a parallel configuration.

5. The riding lawn mower of claim 1, wherein each of the plurality of battery packs is configured to be electrically coupled to a common power bus, wherein the riding lawn mower is electrically connected to the common power bus.

6. The riding lawn mower of claim 1, wherein the plurality of battery packs removably coupled to the riding lawn mower are positioned between the pair of rear drive wheels.

7. The riding lawn mower of claim 1, wherein each of the plurality of battery packs is rated to supply at least 1 kilowatt-hour of electrical energy to the riding lawn mower.

8. A riding lawn mower comprising:
   a pair of rear drive wheels;
   a pair of front wheels;
   a deck positioned between the pair of front wheels and the pair of rear drive wheels;
   a rotatable cutting blade;
   a plurality of battery packs removably coupled to the riding lawn mower and structured to provide power to the riding lawn mower, each battery pack graspable and removable by a user; and
   a battery management system configured to control a plurality of switching elements associated with the plurality of battery packs, wherein the plurality of switching elements are movable between an open position and a closed position to control a current flow from each of the plurality of battery packs to the riding lawn mower, wherein the plurality of switching elements are MOSFETs, and wherein the MOSFETs are positioned within a battery tray on the riding lawn mower, wherein the battery tray is configured to selectively receive the plurality of battery packs,
   wherein the plurality of battery packs sequentially provide power to the riding lawn mower.

* * * * *